US012640496B2

(12) United States Patent
Zhou et al.

(10) Patent No.: US 12,640,496 B2
(45) Date of Patent: May 26, 2026

(54) ANTENNA, DRIVING METHOD THEREFOR, MANUFACTURING METHOD THEREFOR, AND ANTENNA SYSTEM

(71) Applicants: Beijing BOE Technology Development Co., Ltd., Beijing (CN); BOE Technology Group Co., Ltd., Beijing (CN)

(72) Inventors: Jian Zhou, Beijing (CN); Yidan Peng, Beijing (CN); Feng Qu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 325 days.

(21) Appl. No.: 18/579,874

(22) PCT Filed: Feb. 2, 2023

(86) PCT No.: PCT/CN2023/074285
§ 371 (c)(1),
(2) Date: Jan. 17, 2024

(87) PCT Pub. No.: WO2024/159490
PCT Pub. Date: Aug. 8, 2024

(65) Prior Publication Data
US 2025/0079720 A1 Mar. 6, 2025

(51) Int. Cl.
*H01Q 21/06* (2006.01)

(52) U.S. Cl.
CPC ......... *H01Q 21/064* (2013.01); *H01Q 21/065* (2013.01)

(58) Field of Classification Search
CPC ...... H01Q 21/064; H01Q 21/065; H01Q 3/44; H01Q 3/00
See application file for complete search history.

(56) References Cited

U.S. PATENT DOCUMENTS

2005/0052321 A1 3/2005 Lee et al.
2017/0301475 A1 10/2017 Stevenson et al.
(Continued)

FOREIGN PATENT DOCUMENTS

CN 109964365 A 7/2019
CN 110176673 A 8/2019
(Continued)

*Primary Examiner* — Dieu Hien T Duong
(74) *Attorney, Agent, or Firm* — Ling Wu; Stephen Yang; Ling and Yang Intellectual Property

(57) ABSTRACT

Disclosed are an antenna, a driving method therefor, a manufacturing method therefor, and an antenna system. The antenna includes an antenna structure (1), wherein the antenna structure (1) includes a first substrate (101) and a second substrate (102) which are oppositely arranged, and a liquid crystal layer (100) filled between the first substrate (101) and the second substrate (102). A first conductive layer (11) is disposed on a side of the first substrate (101) close to the second substrate (102), a plurality of slots (111) are disposed on the first conductive layer (11), and the slots (111) penetrate through the first conductive layer (11) in a direction perpendicular to a plane where the first conductive layer (11) is located. A plurality of switch structures (13) and a plurality of conductive structures (12) are disposed on a side of the second substrate (102) close to the first substrate (101).

20 Claims, 15 Drawing Sheets

(56) References Cited

U.S. PATENT DOCUMENTS

| | | | |
|---|---|---|---|
| 2018/0233821 | A1 | 8/2018 | Pham et al. |
| 2019/0036227 | A1* | 1/2019 | Linn ...................... H01Q 21/06 |
| 2020/0243966 | A1 | 7/2020 | Bily et al. |
| 2020/0381824 | A1* | 12/2020 | Kao ......................... H01Q 3/36 |
| 2021/0296772 | A1 | 9/2021 | Yu |
| 2021/0359397 | A1 | 11/2021 | Qin et al. |
| 2022/0085497 | A1 | 3/2022 | Khripkov et al. |
| 2023/0344118 | A1 | 10/2023 | Wang et al. |

FOREIGN PATENT DOCUMENTS

| | | | |
|---|---|---|---|
| CN | 110365422 | A | 10/2019 |
| CN | 111682317 | A | 9/2020 |
| CN | 113258305 | A | 8/2021 |
| CN | 115579636 | A | 1/2023 |
| EP | 3891841 | A1 | 10/2021 |
| WO | 2022198460 | A1 | 9/2022 |

* cited by examiner

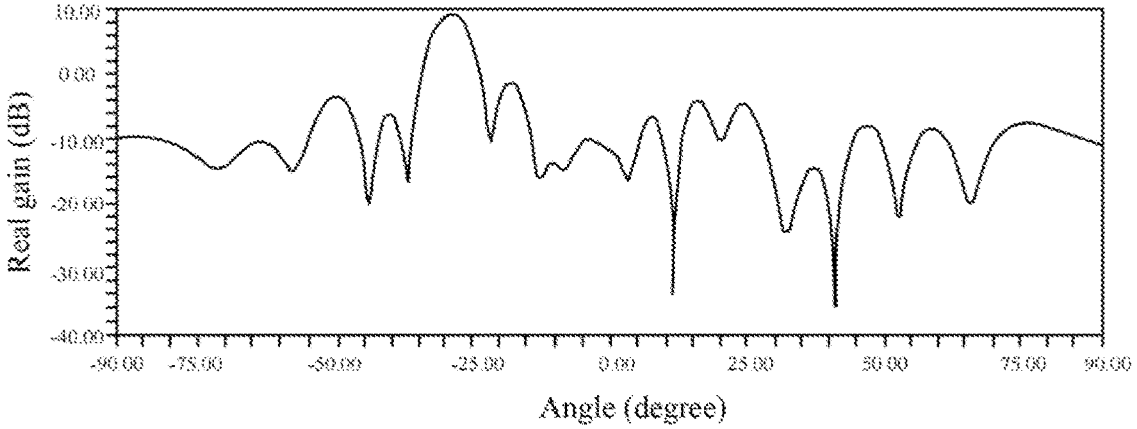

FIG. 31

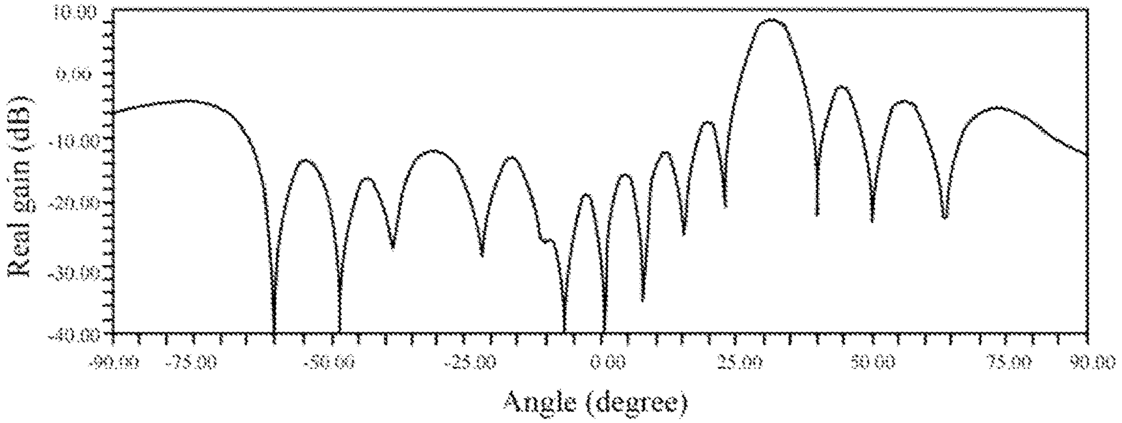

FIG. 32

Act S1: manufacture a first substrate and a second substrate, form a first conductive layer on a side of the first substrate, dispose a plurality of slots on the first conductive layer, wherein the slots penetrate through the first conductive layer in a direction perpendicular to a plane where the first conductive layer is located; form a plurality of switch structures and a plurality of conductive structures on a side of the second substrate, wherein the plurality of switch structures are connected with the plurality of conductive structures, respectively

↓

Act S2: align the first substrate with the second substrate, so that the first conductive layer is located on a side of the first substrate close to the second substrate, a plurality of switch structures and a plurality of conductive structures are located on a side of the second substrate close to the first substrate, the plurality of conductive structures correspond to the plurality of slots, respectively, and the conductive structures are moved to or away from the corresponding slots under control of the corresponding switch structures

↓

Act S3: Fill liquid crystal between the first substrate and the second substrate to form a liquid crystal layer

FIG. 33

ANTENNA, DRIVING METHOD THEREFOR, MANUFACTURING METHOD THEREFOR, AND ANTENNA SYSTEM

CROSS-REFERENCE TO RELATED APPLICATION

The present application is a U.S. National Phase Entry of International PCT Application No. PCT/CN2023/074285 having an international filing date of Feb. 2, 2023, the above-identified application is incorporated by reference herein in their entirety.

TECHNICAL FIELD

Embodiments of the present disclosure relates to, but are not limited to, the field of communication technologies, in particular to an antenna, a driving method therefor, a manufacturing method therefor and an antenna system.

BACKGROUND

Performances of an antenna are very important for an overall performance of most wireless communication systems. With development of science and technologies, requirements on the antenna performances increase gradually. Besides traditional indexes such as gain and polarization, the antenna is often required to have characteristics of a low profile, a light weight and a conformal ability. As a kind of high gain antenna, a holographic antenna can satisfy both the requirements on the low profile and the light weight, so it is very suitable for requirements of current scientific and technological development and has full development potential.

SUMMARY

The following is a summary of subject matter described herein in detail. The summary is not intended to limit the protection scope of claims.

In a first aspect, an antenna is provided in an embodiment of the present disclosure. The antenna includes an antenna structure, wherein the antenna structure includes a first substrate, a second substrate disposed opposite to the first substrate, and a liquid crystal layer filled between the first substrate and the second substrate, wherein a first conductive layer is provided on a side of the first substrate close to the second substrate, a plurality of slots are provided on the first conductive layer, and the slots penetrate through the first conductive layer in a direction perpendicular to a plane in which the first conductive layer is located; a plurality of switch structures and a plurality of conductive structures are provided on a side of the second substrate close to the first substrate, wherein the plurality of switch structures are connected to the plurality of conductive structures, respectively; the plurality of conductive structures correspond to the plurality of slots, respectively, and the conductive structure is moved to or away from the corresponding slot under control of the corresponding switch structure.

In an exemplary implementation, an orthographic projection of the conductive structure on the first substrate is overlapped, at least partially, with an orthographic projection of the corresponding slot on the first substrate when the conductive structure moves to the corresponding slot; the orthographic projection of the conductive structure on the first substrate is not overlapped, at least partially, with the orthographic projection of the corresponding slot on the first substrate when the conductive structure moves away from the corresponding slot.

In an exemplary implementation, the switch structure includes a stator structure and a support structure which are disposed on the second substrate, wherein the conductive structure is disposed at an end of the support structure away from the second substrate.

In an exemplary implementation, the switch structure further includes a first comb structure and a second comb structure, wherein the first comb structure is disposed at an end of the stator structure away from the second substrate, and the second comb structure is disposed at an end of the support structure away from the second substrate; in an arrangement direction of the switch structure and the conductive structure, and in a plane parallel to the second substrate, the first comb structure and the second comb structure are located between the stator structure and the support structure, and the conductive structure and the second comb structure are located on both sides of the support structure.

In an exemplary implementation, the switch structure further includes a first connection structure and a second connection structure, wherein the first comb structure is disposed to the stator structure through the first connection structure, the second comb structure is connected to the conductive structure through the second connection structure, and the conductive structure is disposed to the support structure through the second connection structure.

In an exemplary implementation, the first comb structure, the second comb structure, the first connection structure, the second connection structure, and the conductive structure are formed by a single patterning process.

In an exemplary implementation, the first comb structure and the first connection structure are integrally formed, and the second comb structure, the second connection structure and the conductive structure are integrally formed.

In an exemplary implementation, the first comb structure includes a first conductive component forming a comb back of the first comb structure, and a plurality of first conductive elements forming comb teeth of the first comb structure; the second comb structure includes a second conductive component forming a comb back of the second comb structure, and a plurality of second conductive elements forming comb teeth of the second comb structure; first ends of the plurality of first conductive elements are connected to the first conductive component, and second ends extend to a first spacer between the plurality of second conductive elements in a direction away from the first conductive component; first ends of the plurality of second conductive elements are connected to the second conductive component, and second ends extend to a second spacer of the plurality of first conductive elements in a direction away from the second conductive component.

In an exemplary implementation, the first conductive element and the plurality of second conductive elements are alternately arranged in a plane parallel to the second substrate along an arrangement direction perpendicular to the first conductive component and the second conductive component.

In an exemplary implementation, the switch structure further includes a fixing structure disposed on the second substrate and a support structure disposed on a side of the fixing structure away from the second substrate; in a plane perpendicular to the second substrate and in a direction from the second substrate to the first substrate, one end of the support structure is connected to the conductive structure and the second comb structure, and another end is connected to the fixing structure.

In an exemplary implementation, the support structure is a support plate whose thickness in the direction from the second substrate to the first substrate gradually decreases.

In an exemplary implementation, the plurality of conductive structures are arranged along the first direction and the plurality of slots are arranged along the first direction in a plane parallel to the antenna structure.

In an exemplary implementation, the plurality of conductive structures include at least two rows of conductive structures, and there are a plurality of conductive structures in any row of the at least two rows of the conductive structures; the plurality of slots include at least two rows of slots, and there are a plurality of slots in any row of the at least two rows of slots; in a plane parallel to the antenna structure, a plurality of conductive structures in any one row are arranged along the first direction, a plurality of slots in any row are arranged along the first direction, two adjacent rows of conductive structures are disposed staggerly, and two adjacent rows of slots are disposed staggerly.

In an exemplary implementation, first center lines of two adjacent rows of slots are parallel to each other, or form a first intersection angle, and an extension direction of the first center line coincide with an extension directions of a long side of a corresponding slot.

In an exemplary implementation, the first intersection angle is 90°; in a plane parallel to the antenna structure and in two adjacent rows of slots, a first center line of one row of slots extends in the second direction and a first center line of another row of slots extends in the first direction; alternatively, in two adjacent rows of slots, the first center line of one row of slots and the first direction form an angle of 45°, and a first center line of another row of slots and the first direction form an angle of 135°.

In an exemplary implementation, the conductive structure is a rectangular patch, a shape of the slot is a rectangle or a butterfly; when the conductive structure moves to the corresponding slot, an orthographic projection of a rectangular patch on the base substrate covers an orthographic projection of a middle part of the slot on the base substrate.

In an exemplary implementation, a length of the rectangular patch ranges from 0.2 mm to 0.8 mm, and a width of the rectangular patch ranges from 0.2 mm to 0.4 mm;

- a width of the rectangular slot ranges from 0.05 mm to 0.15 mm, and a length of the rectangular slot ranges from 4.5 mm to 6 mm;
- a butterfly-shaped slot includes a first slot, a second slot and a third slot that communicate in turn, wherein the first slot and the third slot are symmetrical with respect to the second slot; dimensions of the first slot and the third slot along a length direction of the slot range from 1 mm to 3 mm, dimensions of the first slot and the third slot in a width direction of the slot gradually increase from an end of each of the first slot of the third slot connected with the second slot to an end of each of the first slot of the third slot far away from the second slot, and maximum dimensions along the width direction of the slot range from 0.1 mm to 0.14 mm; a dimension of the second slot in the length direction of the slot ranges from 0.3 mm to 0.5 mm, and a dimension of the second slot in the width direction of the slot ranges from 10 microns to 30 microns.

In an exemplary implementation, the conductive structure is a circular patch, the shape of the slot is annular, and when the conductive structure moves to the corresponding slot, an orthographic projection of the circular patch on the first substrate covers an orthographic projection of the annular slot on the first substrate.

In an exemplary implementation, the antenna further includes a waveguide structure disposed on a side of the first substrate away from the second substrate, wherein the waveguide structure includes a feed-in port and a feed-out port disposed on a side of the waveguide structure away from the first substrate.

In an exemplary implementation, the waveguide structure includes a waveguide cavity encompassed by four side surfaces, a top surface and a bottom surface; wherein the first substrate serves as the top surface of the waveguide structure, and the feed-in port and the feed-out port are disposed on the bottom surface.

In an exemplary implementation, one of the conductive structures corresponds to one of the slots which corresponds to one or more of the conductive structures.

In a second aspect, an antenna system is also provided in an embodiment of the present disclosure, which includes a flexible printed circuit and the antenna described in any of the above embodiments, wherein the flexible printed circuit is electrically connected with the antenna.

In a third aspect, a method for driving an antenna is provided in an embodiment of the present disclosure. The antenna includes an antenna structure, wherein the antenna structure includes a first substrate, a second substrate disposed opposite to the first substrate, and a liquid crystal layer filled between the first substrate and the second substrate, wherein a first conductive layer is provided on a side of the first substrate close to the second substrate, a plurality of slots are provided on the first conductive layer, and the slots penetrate through the first conductive layer in a direction perpendicular to a plane in which the first conductive layer is located; a plurality of switch structures and a plurality of conductive structures are provided on a side of the second substrate close to the first substrate, wherein the plurality of switch structures are connected to the plurality of conductive structures, respectively; the plurality of conductive structures correspond to the plurality of slots, respectively, An operating method includes:

- applying a first signal to a first conductive layer; applying a plurality of driving signals in a driving signal group corresponding to a target operating frequency to the plurality of switch structures, respectively; applying a plurality of second signals in a voltage signal group corresponding to a target beam direction to a plurality of conductive structures, respectively; and moving the conductive structures to or away from corresponding slots under control of the corresponding switch structures.

In an exemplary implementation, the switch structure includes a stator structure, a support structure, a first comb structure and a second comb structure, wherein the support structure and the stator structure are disposed on the second substrate, and a conductive structure is disposed at an end of the support structure away from the second substrate; the first comb structure is disposed at an end of the stator structure away from the second substrate; the second comb structure is disposed at an end of the support structure away from the second substrate; in an arrangement direction of the switch structure and the conductive structure, and in a plane parallel to the second substrate, the first comb structure and the second comb structure are located between the stator structure and the support structure, and the conductive structure and the second comb structure are located on both sides of the support structure;

applying the plurality of driving signals in the driving signal group corresponding to the target beam direction to the plurality of switch structures, respectively, includes applying a plurality of driving signals in a driving signal group corresponding to a target beam direction to a plurality of stator structures, respectively, such that the driving signals are transmitted to the first comb structure via the stator structures; and applying the plurality of second signals in the voltage signal group corresponding to a target beam direction to the plurality of conductive structures, respectively, includes applying second signals in a voltage signal group corresponding to a target beam direction to a plurality of support structures, respectively, such that the second signals are transmitted to the second comb structure and the conductive structure via the support structure.

In a fourth aspect, a method for manufacturing a display panel is provided in an embodiment of the present disclosure. The method includes:

manufacturing a first substrate and a second substrate, forming a first conductive layer on a side of the first substrate, forming a plurality of slots on the first conductive layer, wherein the slots penetrate through the first conductive layer in a direction perpendicular to a plane where the first conductive layer is located; forming a plurality of switch structures and a plurality of conductive structures on a side of the second substrate, wherein the plurality of switch structures are connected with the plurality of conductive structures, respectively;

aligning the first substrate with the second substrate, so that the first conductive layer is located on a side of the first substrate close to the second substrate, a plurality of switch structures and a plurality of conductive structures are located on a side of the second substrate close to the first substrate, the plurality of conductive structures correspond to the plurality of slots, respectively; and moving the conductive structures to or away from the corresponding slots under control of the corresponding switch structures; and filling liquid crystal between the first substrate and the second substrate to form a liquid crystal layer.

In an exemplary implementation, the switch structure includes a stator structure, a support structure, a first comb structure, a second comb structure; forming the plurality of switch structures and the plurality of conductive structures on one side of the second substrate, includes:

forming the stator structure and the support structure on a side of the second substrate;

forming a first comb structure, a second comb structure and a conductive structure on a side of the stator structure and the support structure away from the second substrate; in an arrangement direction of the switch structure and the conductive structure, and in a plane parallel to the second substrate, the first comb structure and the second comb structure are located between the stator structure and the support structure, and the conductive structure and the second comb structure are located on both sides of the support structure.

In an exemplary implementation, forming the stator structure and the support structure on a side of the second substrate, includes:

forming a second insulating layer on a side of the second substrate, patterning the second insulating layer by a patterning process to form a second insulating layer pattern, wherein the second insulating layer pattern includes a first opening forming the stator structure, and a second opening forming the support structure;

forming the support structure and the stator structure on a side of the second insulating layer away from the second substrate, wherein the stator structure is formed at the first opening, and the support structure is formed at the second opening;

forming the first comb structure, the second comb structure and the conductive structure on the side of the stator structure and the support structure away from the second substrate, includes:

forming a third insulating layer on the second insulating layer, patterning the third insulating layer by a patterning process to form a third insulating layer pattern, wherein the third insulating layer pattern includes a third opening forming the first comb structure, a fourth opening forming the second comb structure, and a fifth opening forming the conductive structure;

forming the first comb structure, the second comb structure and the conductive structure on a side of the third insulating layer away from the second insulating layer, wherein the first comb structure is formed at the third opening, the second comb structure is formed at the fourth opening, and the conductive structure is formed at the fifth opening;

after forming the first comb structure, the second comb structure and the conductive structure on the side of the stator structure and the support structure away from the second substrate, the method includes removing the second insulating layer and the third insulating layer.

In an exemplary implementation, the switch structure further includes a fixing structure, and the method further includes the following acts before the act of forming the second insulating layer on one side of the second substrate:

forming a first insulating layer on the second substrate, patterning the first insulating layer by a patterning process to form a first insulating layer pattern, wherein the first insulating layer pattern includes a sixth opening of the fixing structure;

forming the fixing structure on a side of the first insulating layer away from the second substrate, wherein the fixing structure is formed at the sixth opening; and forming the second insulating layer on one side of the second substrate includes forming the second insulating layer on one side of the first insulating layer away from the second substrate.

Other aspects may be understood upon reading and understanding accompanying drawings and detailed description.

BRIEF DESCRIPTION OF DRAWINGS

Accompanying drawings are intended to provide a further understanding of technical solutions of the present disclosure and form a part of the specification, and are used to explain the technical solutions of the present disclosure together with embodiments of the present disclosure, and do not form limitations on the technical solutions of the present disclosure. Shapes and sizes of each component in the drawings do not reflect actual scales, and are only intended to schematically illustrate contents of the present disclosure.

FIGS. 30 to 32 show graphs of simulation results of an antenna according to an exemplary embodiment of the present disclosure;

FIG. 33 is a flowchart of a method for manufacturing an antenna according to an embodiment of the present disclosure;

DETAILED DESCRIPTION

Figure 1:
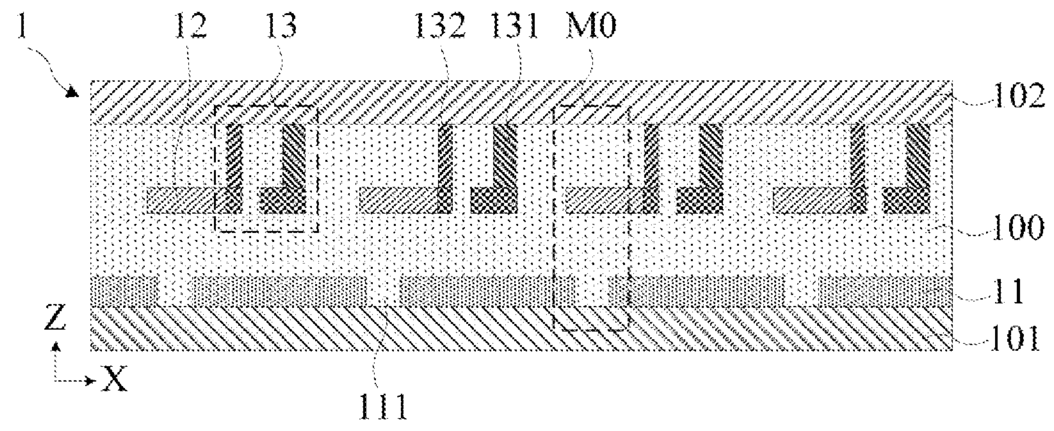
FIG. 1 is a schematic diagram of a sectional structure of an antenna according to an exemplary embodiment of the present disclosure.

Embodiments of the present disclosure will be described below in with reference to the drawings in detail. Implementations may be implemented in a plurality of different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other if there is no conflict. In order to keep the following description of the examples of the present disclosure clear and concise, detailed descriptions of part of known functions and known components are omitted in the present disclosure. The drawings in the embodiments of the present disclosure relate only to the structures involved in the embodiments of the present disclosure, and other structures may be described with reference to conventional designs.

Scales of the drawings in the present disclosure may be used as a reference in actual processes, but are not limited thereto. For example, a thickness and a pitch of each film layer, and a width and a pitch of each signal line may be adjusted according to an actual situation. The drawings described in the present disclosure are only schematic diagrams of structures, and one implementation of the present disclosure is not limited to shapes or numerical values or the like shown in the drawings.

Ordinal numerals such as "first", "second", and "third" in the specification are set to avoid confusion between constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to a direction which is used for describing each constituent element. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, a detachable connection, or an integrated connection; it may be a mechanical connection or an electrical connection; it may be a direct mutual connection, or an indirect connection through middleware, or internal communication between two elements. Those of ordinary skills in the art may understand specific meanings of these terms in the present disclosure according to specific situations.

In the specification, an "electrical connection" includes a case that constituent elements are connected together through an element having some electrical function. The "element with the certain electrical effect" is not particularly limited as long as electrical signals may be sent and received between the connected constituent elements. Examples of the "element with a certain electrical effect" not only include an electrode and a wiring, but also may include a switch element such as a transistor, a resistor, an inductor, a capacitor, another element having one or more functions, and the like.

In the specification, "parallel" refers to a state in which an angle formed by two straight lines is above −10° and below 10°, and thus may include a state in which the angle is above −5° and below 5°. In addition, "perpendicular" refers to a state in which an angle formed by two straight lines is above 800 and below 100°, and thus may include a state in which the angle is above 850 and below 95°.

In the specification, a "film" and a "layer" are interchangeable. For example, a "conductive layer" may be replaced with a "conductive film" sometimes. Similarly, an "insulation film" may be replaced with an "insulation layer" sometimes.

Triangle, rectangle, trapezoid, pentagon and hexagon in this specification are not strictly defined, and they may be approximate triangle, rectangle, trapezoid, pentagon or hexagon, etc. There may be some small deformation caused by tolerance, and there may be chamfer, arc edge and deformation, etc.

In the present disclosure, "about" refers to that a boundary is defined not so strictly and numerical values within process and measurement error ranges are allowed.

In the present disclosure, a "thickness" is a dimension of a film layer in a direction perpendicular to a substrate.

The concept of holographic antenna originates from the principle of optical holography. Its principle is that the interference surface is formed by the interference of object wave and reference wave, and then the object wave is inversion obtained by irradiating the interference surface by reference wave. A holographic antenna system only includes a holographic surface and a feed in a very simple structure. The feed usually uses horn antennas, monopole antennas or gap antennas, and does not need a complex feed network. However, in order to reduce a profile, the monopole antennas or the gap antennas are often used as feed. The holographic surface is mainly composed of dielectric substrate and periodically distributed metal patch array, which is simple to process and low in cost. In a design process of the holographic surface, as long as an interference field expression formed by an interference between a target field and a reference field is calculated, and distribution of metal patches is designed according to the interference field expression, a desired holographic surface can be obtained. Therefore, the design process is very simple. If different object waves are obtained, only the target field expression needs to be put into the above process again. The simplicity and flexibility of this design is another advantage of the holographic antenna. In addition, the holographic antenna is easy to be conformal, and its performance will not be greatly affected if it is attached to a spherical surface, a cylindrical surface, or the like. Liquid crystal media are added into a resonant loop formed by the gap and the patch, and a position of a resonant peak of the resonant loop is tuned by applying different voltages between the gap and the patch to change an equivalent refractive index, that is, tuning of the radiation energy. A spatial beam direction can be reconstructed by combining an amplitude sampling algorithm. Although an orientation of the liquid crystal can be adjusted in related technologies, it is very difficult to adjust a beam direction of a same antenna, and an operating frequency of the antenna is difficult to adjust, which limits an application of the holographic antenna.

An antenna is provided in an embodiment of the present disclosure, which may include an antenna structure, wherein the antenna structure includes a first substrate, a second substrate disposed opposite to the first substrate, and a liquid crystal layer filled between the first substrate and the second substrate, wherein a first conductive layer is provided on a side of the first substrate close to the second substrate, a plurality of slots are provided on the first conductive layer, and the slots penetrate through the first conductive layer in a direction perpendicular to a plane in which the first conductive layer is located; a plurality of switch structures and a plurality of conductive structures are provided on a side of the second substrate close to the first substrate, wherein the plurality of switch structures are connected to the plurality of conductive structures, respectively; the plurality of conductive structures correspond to the plurality of slots, respectively, and each of the conductive structures is moved to or away from the corresponding slot under control of the corresponding switch structure.

According to the antenna provided in the embodiments of the present disclosure, the antenna may include an antenna structure, wherein the antenna structure includes a first conductive layer disposed on a first substrate, a plurality of switch structures and a plurality of conductive structures disposed on a second substrate, and a liquid crystal layer filled between the first substrate and the second substrate. The first conductive layer is provided with a plurality of slots penetrating the first conductive layer, the plurality of switch structures are respectively connected with the plurality of conductive structures, the plurality of conductive structures correspond to the plurality of slots, respectively. The conductive structures move to or away from the corresponding slots under control of the corresponding switch structures. The first conductive layer is configured to receive a first signal, the plurality of conductive structures are configured to receive, respectively, a plurality of second signals in a voltage signal group corresponding to the target beam direction, and the plurality of switch structures are configured to receive, respectively, a plurality of driving signals in a driving signal group corresponding to the target operating frequency. By the plurality of conductive structures receiving the plurality of second signals in the voltage signal group corresponding to the target beam direction, the antenna can receive or transmit the target beam in different directions. By the plurality of switch structures receiving, respectively, the plurality of driving signals in the driving signal group corresponding to the target operating frequency, the conductive structure move to or away from the corresponding slots under the control of the corresponding switch structures, such that adjustment of an operating frequency of the antenna is achieved, thus overcoming a shortage of a limited application of the holographic antenna in the prior art.

Figure 2:
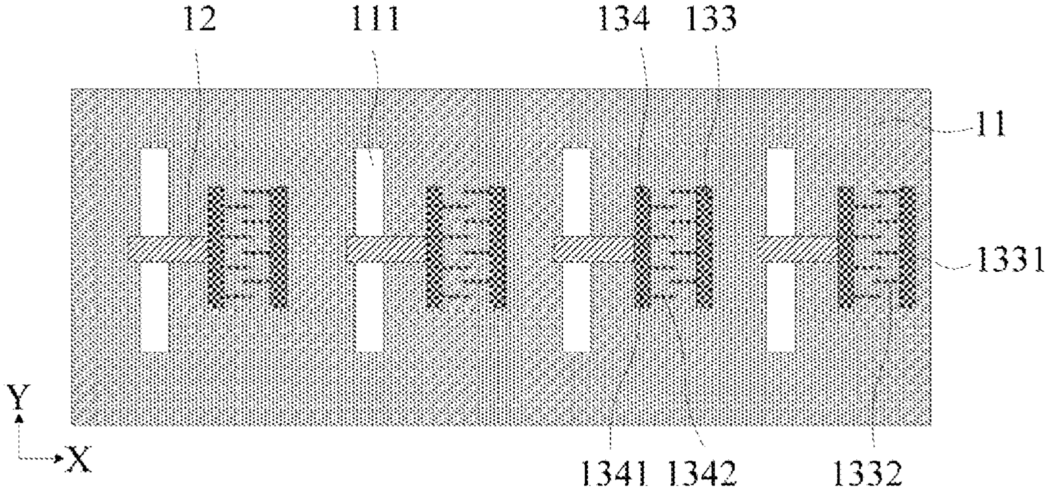
FIG. 2 is a schematic diagram of a planar structure of an antenna structure according to an exemplary embodiment of the present disclosure.

In an exemplary implementation, as shown in FIGS. 1 and 2, an antenna may include an antenna structure 1, wherein the antenna structure 1 may include a first substrate 101, a second substrate 102 disposed opposite to the first substrate 101, and a liquid crystal layer 100 filled between the first substrate 101 and the second substrate 102. A first conductive layer 11 is provided on a side of the first substrate 101 close to the second substrate 102, a plurality of slots 111 are provided on the first conductive layer 11, and the slots 111 penetrate through the first conductive layer 11 in a direction perpendicular to a plane in which the first conductive layer 11 is located (Z direction in FIG. 1). A plurality of switch structures 13 and a plurality of conductive structures 12 are provided on a side of the second substrate 102 close to the first substrate 101. The plurality of switch structures 13 are connected to the plurality of conductive structures 12, respectively. The plurality of conductive structures 12 correspond to the plurality of slots 111, respectively. The conductive structure 12 is moved to or away from the corresponding slot 111 under control of the corresponding switch structure 13.

In an exemplary implementation, the first conductive layer 11 may be configured to receive a first signal, the plurality of conductive structures 12 may be configured to receive a plurality of second signals in a voltage signal group corresponding to a target beam direction, and the switch structure 13 may be arranged to receive a plurality of driving signals in a driving signal group corresponding to a target operating frequency.

Figure 3:
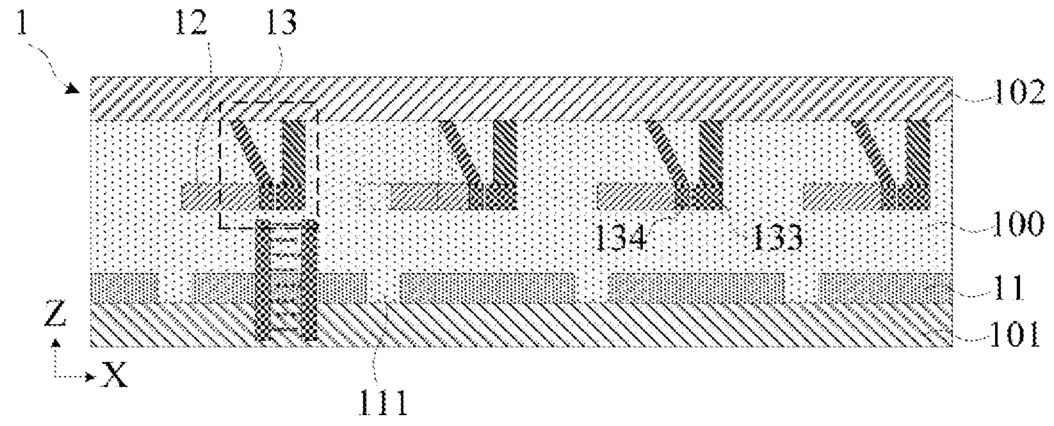
FIG. 3 is a schematic diagram of a sectional structure of an antenna structure according to an exemplary embodiment of the present disclosure.
Figure 4:
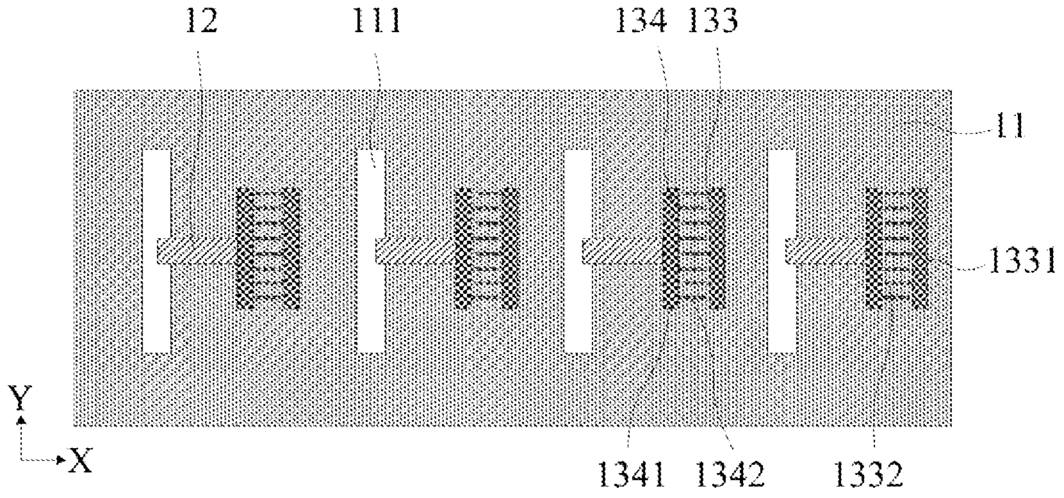
FIG. 4 is a schematic diagram of a planar structure of an antenna structure according to an exemplary embodiment of the present disclosure.

In an exemplary implementation, as shown in FIGS. 1 and 2, when the conductive structure 12 moves to the corresponding slot 111, an orthographic projection of the conductive structure 12 on the first substrate 101 is overlapped, at least partially, with an orthographic projection of the corresponding slot 111 on the first substrate 101. As shown in FIGS. 3 and 4, when the conductive structure 12 moves away from the corresponding slot 111, the orthographic projection of the conductive structure 12 on the first substrate 101 is not overlapped, at least partially, with the orthographic projection of the corresponding slot 111 on the first substrate 101.

In an exemplary implementation, as shown in FIGS. 1 to 4, the switch structure 13 may include a stator structure 131 and a support structure 132 which are disposed on the second substrate 102, wherein the conductive structure 12 is disposed at an end of the support structure 132 away from the second substrate 102.

In an exemplary implementation, as shown in FIGS. 1 to 4, the switch structure 13 may further include a first comb structure 133 and a second comb structure 134, wherein the first comb structure 133 is disposed at an end of the stator structure 131 away from the second substrate 102, and the second comb structure 134 is disposed at an end of the support structure 132 away from the second substrate 102. In an arrangement direction of the switch structure 13 and the conductive structure 12 (opposite to an X direction in FIGS. 1 and 4), and in a plane parallel to the second substrate 102, the first comb structure 133 and the second comb structure 134 may be located between the stator structure 131 and the support structure 132, and the conductive structure 12 and the second comb structure 134 may be located on both sides of the support structure 132.

Figure 5:
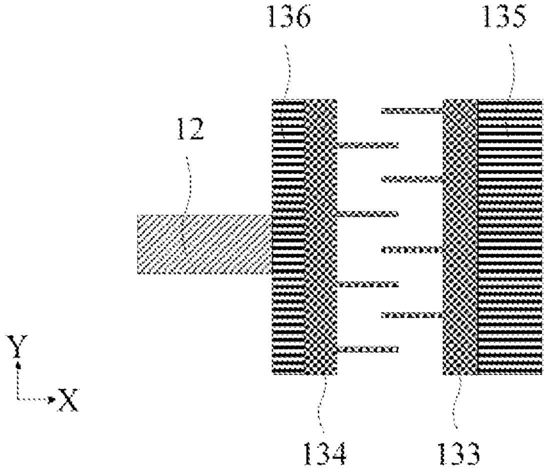
FIG. 5 is a schematic diagram of a planar structure of a switch structure according to an exemplary embodiment of the present disclosure.
Figure 6:
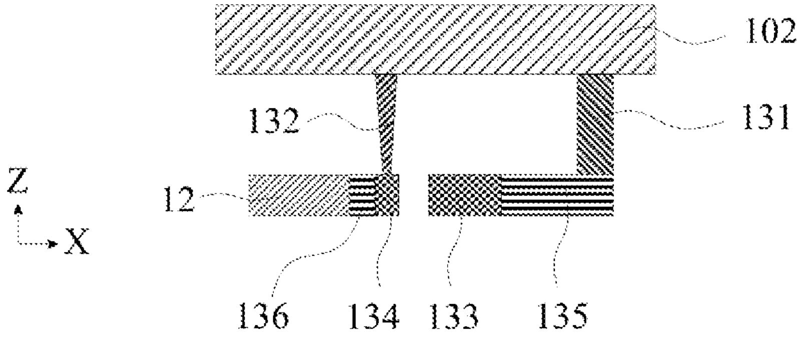
FIG. 6 is a schematic diagram of a sectional structure of a switch structure according to an exemplary embodiment of the present disclosure.

In an exemplary implementation, as shown in FIGS. 5 and 6, the switch structure 13 may further include a first connection structure 135 and a second connection structure 136, wherein the first comb structure 133 is disposed to the stator structure 131 through the first connection structure 135, the second comb structure 134 is connected to the conductive structure 12 through the second connection structure 136, and the conductive structure 12 is disposed to the support structure 132 through the second connection structure 136.

In an exemplary implementation, the first comb structure 133, the second comb structure 134, the first connection structure 135, the second connection structure 136 and the conductive structure 12 may be formed by a single patterning process.

In an exemplary implementation, the first comb structure 133 and the first connection structure 135 may be integrally formed, and the second comb structure 134, the second connection structure 136 and the conductive structure 12 may be integrally formed.

In an exemplary implementation, as shown in FIGS. 2, 4, and 5, the first comb structure 133 may include a first conductive component 1331 forming a comb back of the first comb structure 133, and a plurality of first conductive elements 1332 forming comb teeth of the first comb structure 133. The second comb structure 134 may include a second conductive component 1341 forming a comb back of the second comb structure 134, and a plurality of second conductive elements 1342 forming comb teeth of the second comb structure 134.

First ends of the plurality of first conductive elements 1332 are connected to the first conductive component 1331, and second ends extend to a first spacer A1 between the plurality of second conductive elements 1342 in a direction away from the first conductive component 1331. First ends of the plurality of second conductive elements 1342 are connected to the second conductive component 1341, and second ends extend to a second spacer A2 of the plurality of first conductive elements 1332 in a direction away from the second conductive component 1341. In the embodiment of the present disclosure, the second ends of the plurality of first conductive elements 1332 extend to the first spacer A1 between the plurality of second conductive elements 1342 in the direction away from the first conductive component 1331, and the second ends of the plurality of second conductive elements 1342 extend to the second spacer A2 of the plurality of first conductive elements 1332 in the direction away from the second conductive component 1341, enabling a comb-tooth structures of the first comb structure 133 and the second comb structure 134 to be alternated, increasing an electrostatic effect, making the support structure 132 more likely to move toward the stator structure 131 in case of a potential of the support structure 132 being inconsistent with a potential of the stator structure 131, thereby making the conductive structure 12 more likely to move from (i.e. away from) the slot 111 driven by the switch structure.

In an exemplary implementation, as shown in FIGS. 2, 4 and 5, the first conductive element 1332 and the plurality of second conductive elements 1342 are alternately arranged in a plane parallel to the second substrate 102 (which may be a plane where the first direction X and a second direction Y are located) along an arrangement direction perpendicular to the first conductive component 1331 and the second conductive component 1341 (which may be the second direction Y in FIG. 2).

Figure 7:
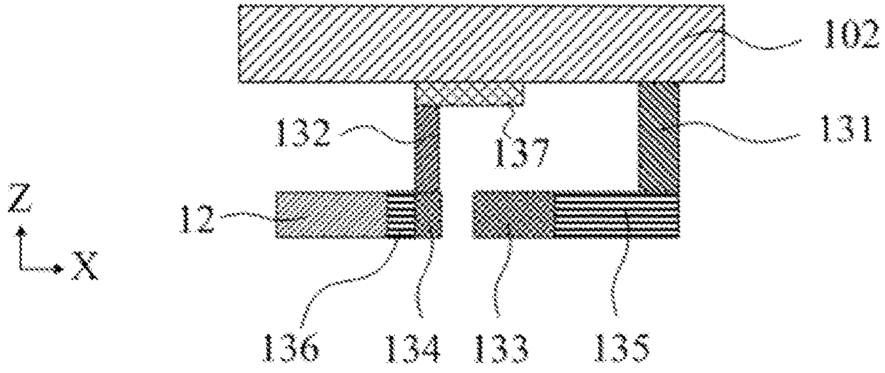
FIG. 7 is a schematic diagram of a sectional structure of a switch structure according to an exemplary embodiment of the present disclosure.
Figure 8:
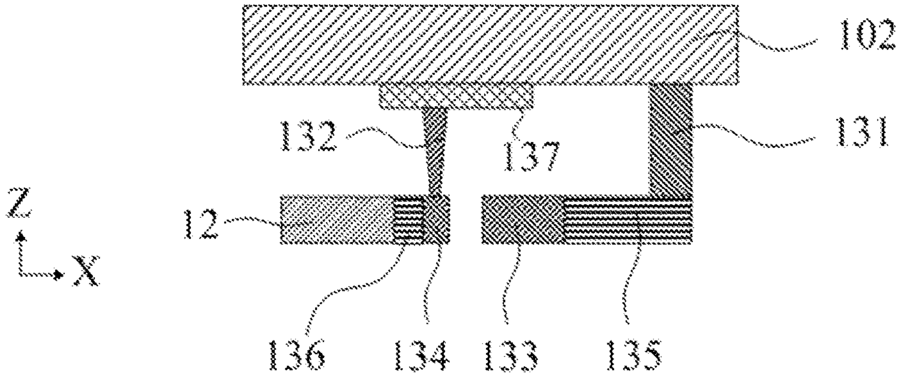
FIG. 8 is a schematic diagram of a sectional structure of a switch structure according to an exemplary embodiment of the present disclosure.

In an exemplary implementation, as shown in FIGS. 7 and 8, the switch structure 13 may further include a fixing structure 137 disposed on the second substrate 102, and the support structure is disposed on a side of the fixing structure 137 away from the second substrate 102. In a plane perpendicular to the second substrate 102 and in a direction (which may be a Z direction in the figures) from the second substrate 102 to the first substrate 101, one end of the support structure is connected to the conductive structure 12 and the second comb structure 134, and another end is connected to the fixing structure 137. In the embodiment of the present disclosure, the fixing structure 137 may enable the support structure 132 to be disposed on the second substrate 102 more securely.

In an exemplary implementation, an orthographic projection of the fixing structure 137 on the first substrate 101 is not overlapped, at least partially, with the orthographic projection of the corresponding slot 111 on the first substrate 101, or an orthographic projection of the fixing structure 137 on the first substrate 101 is not overlapped with the orthographic projection of the corresponding slot 111 on the first substrate 101, so as to avoid the fixing structure 137 from shielding the slot 111.

In an exemplary implementation, as shown in FIGS. 6 and 8, the support structure 132 is a support plate whose thickness in the direction from the second substrate 102 to the first substrate 101 may gradually decrease. In the embodiment of the present disclosure, on a premise that the support structure 132 supports the second comb structure and can be firmly disposed on the second substrate, the gradually decreased thickness of the support plate 132 in the direction from the second substrate 102 to the first substrate 101 is easier for the support structure 132 to drive the conductive structure 12 to move (since the thickness of the support structure 132 near the conductive structure 12 is thin such that the conductive structure is easier to drive) when the potential of the support structure 132 is different from the potential of the stator junction 131 (a potential of the first comb structure is different from a potential of the second comb structure).

In an exemplary implementation, as shown in FIG. 2, the plurality of conductive structures 12 may be arranged along the first direction X and the plurality of slots 111 may be arranged along the first direction X in a plane parallel to the antenna structure 1.

In an exemplary implementation, as shown in FIGS. 9 to 14, the plurality of conductive structures 12 include at least two rows of conductive structures 12, and there are a plurality of conductive structures 12 in any row of the at least two rows of the conductive structures 12. The plurality of slots 111 include at least two rows of slots, and there are a plurality of slots 111 in any row of the at least two rows of slots. In a plane parallel to the antenna structure 1, a plurality of conductive structures 12 in any one row are arranged along the first direction X, a plurality of slots 111 in any row are arranged along the first direction X, two adjacent rows of conductive structures 12 are disposed staggerly, and two adjacent rows of slots 111 are disposed staggerly.

Figure 9:
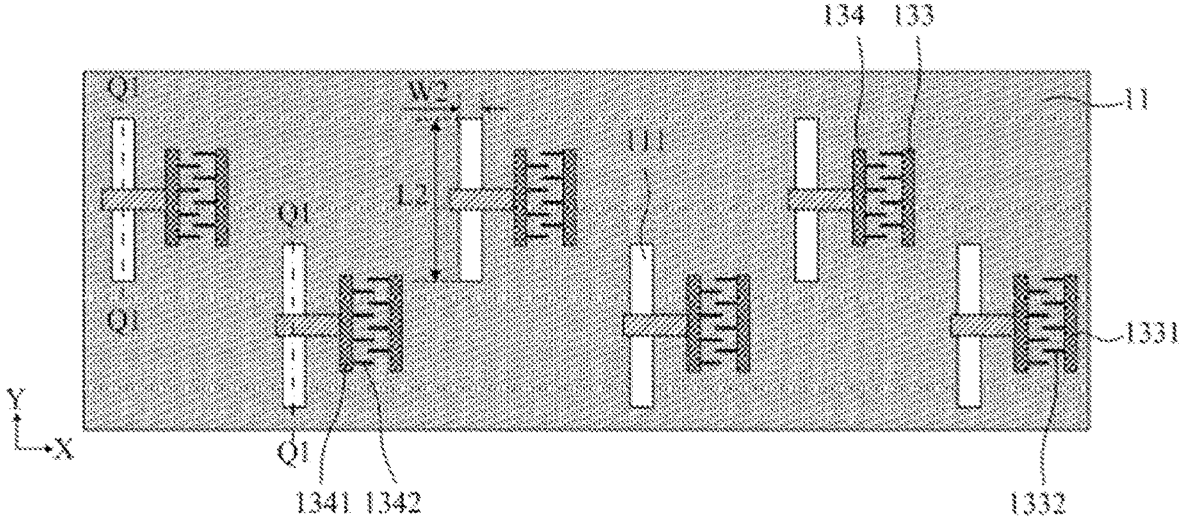
FIG. 9 is a schematic diagram of a planar structure of an antenna structure according to an exemplary embodiment of the present disclosure.

In an exemplary implementation, as shown in FIGS. 9 to 14, first center lines Q1-Q1 of two adjacent rows of slots 111 are parallel to each other, or form a first intersection angle F1, and an extension direction of the first center line Q1-Q1 coincide with an extension directions of a long side of a corresponding slot 111. As shown in FIG. 9, first midlines Q1-Q1 of two adjacent rows of slots 111 are parallel to each other. As shown in FIGS. 10 to 14, first center lines Q1-Q1 of adjacent two rows of slots 111 form a first intersection angle F1.

In an exemplary implementation, as shown in FIGS. 10 to 13, in two adjacent rows of slots 111, a first center line Q1-Q1 of one row of slots 111 and the first direction X form a second intersection angle F2, and a first center line Q1-Q1 of another row of slots 111 and the first direction X form a third intersection angle F3.

In an exemplary implementation, the first intersection angle F1 ranges, approximately, from 45 degrees to 135 degrees, the second intersection angle F2 ranges, approximately, from 15 degrees to 60 degrees, and the third intersection angle F3 ranges, approximately, from 90 degrees to 160 degrees.

In an exemplary implementation, the first intersection angle F1 may be 90°. In a plane parallel to the antenna structure 1, as shown in FIG. 14, in two adjacent rows of slots 111, a first center line Q1-Q1 of one row of slots 111 extends in the second direction Y and a first center line Q1-Q1 of another row of slots 111 extends in the first direction X. Alternatively, as shown in FIGS. 10 to 13, in two adjacent rows of slots 111, the first center line Q1-Q1 of one row of slots 111 and the first direction X form an angle of 45° (a second angle F2), and a first center line Q1-Q1 of another row of slots 111 and the first direction X form an angle of 135° (a third angle F3).

In an exemplary implementation, as shown in FIGS. 2, 4, 9 to 14, the conductive structure 12 may be a rectangular patch. As shown in FIGS. 2, 4, 9 to 17, a shape of the slot 111 may be a rectangle or a butterfly. When the conductive structure 12 moves to the corresponding slot 111, an orthographic projection of a rectangular patch on the base substrate covers an orthographic projection of a middle part of the slot 111 on the base substrate.

Figure 10:
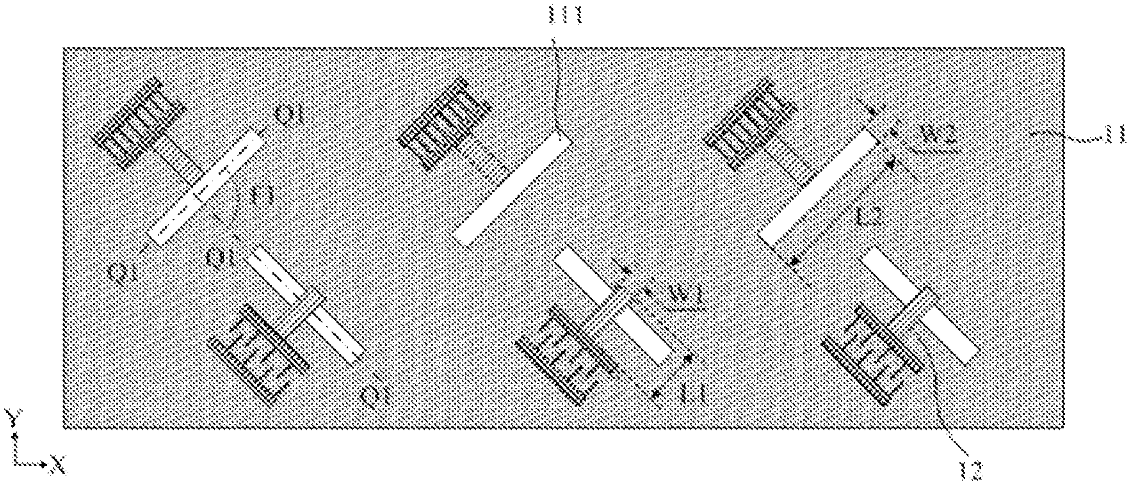
FIG. 10 is a schematic diagram of a planar structure of an antenna structure according to an exemplary embodiment of the present disclosure.
Figure 15:
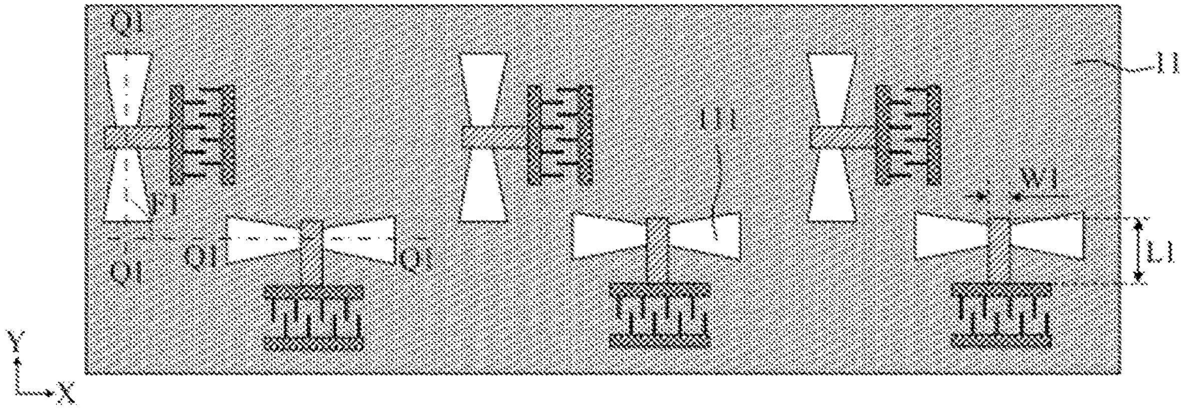
FIG. 15 is a schematic diagram of a planar structure of an antenna structure according to an exemplary embodiment of the present disclosure.
Figure 16:
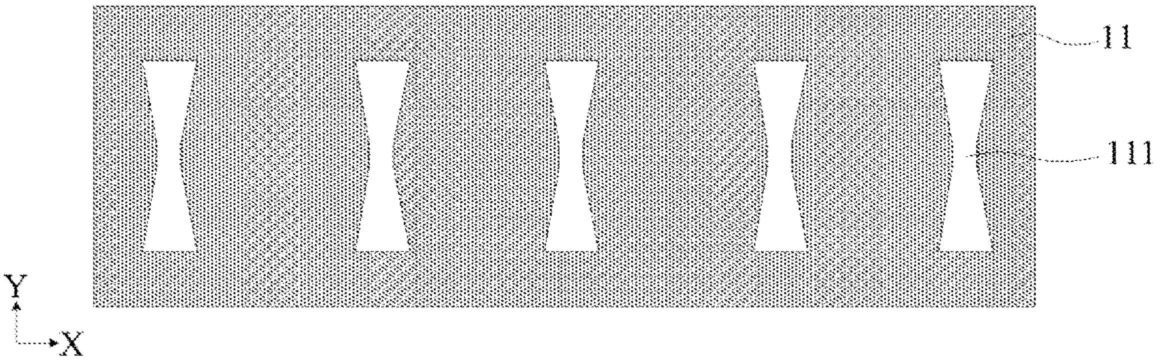
FIG. 16 is a schematic diagram of a planar structure of a first conductive layer according to an exemplary embodiment of the present disclosure.

In an exemplary implementation, as shown in FIGS. 10 and 15, a length L1 of the rectangular patch ranges from 0.2 mm to 0.8 mm, and a width W1 of the rectangular patch ranges from 0.2 mm to 0.4 mm. For example, the length L1 of the rectangular patch is 0.3 mm, and the width W1 of the rectangular patch is 0.3 mm.

In an exemplary implementation, as shown in FIGS. 9 and 10, a width W2 of the rectangular slot 111 ranges from 0.05 mm to 0.15 mm, and a length L2 of the rectangular slot 111 ranges from 4.5 mm to 6 mm. For example, the width W2 of the rectangular slot 111 ranges from 0.05 mm to 0.15 mm, and the length L2 of the rectangular slot 111 ranges from 4.5 mm to 6 mm.

Figure 17:
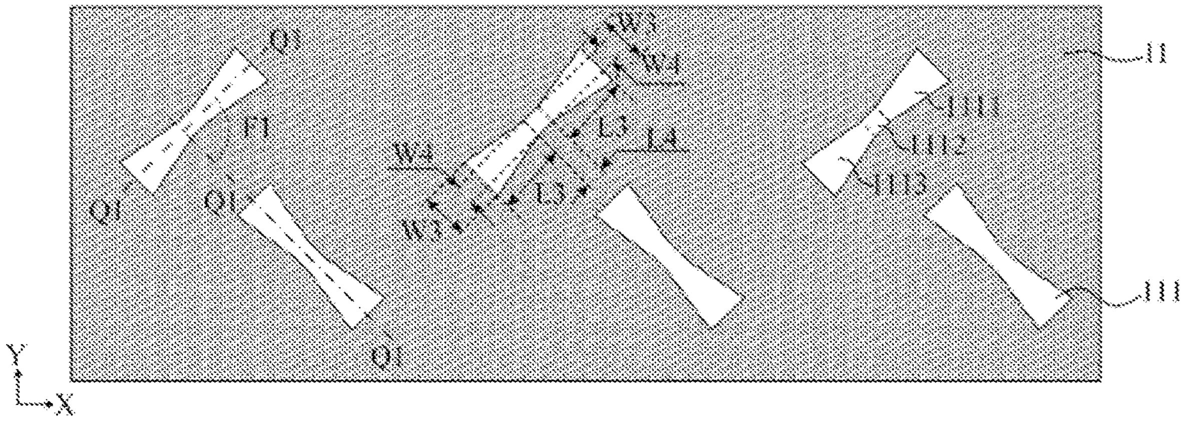
FIG. 17 is a schematic diagram of a planar structure of an antenna structure according to an exemplary embodiment of the present disclosure.

In an exemplary implementation, as shown in FIG. 17, a butterfly-shaped slot 111 may include a first slot 1111, a second slot 1112 and a third slot 1113 that communicate in turn, wherein the first slot 1111 and the third slot 1113 are symmetrical with respect to the second slot 1112. Dimensions L3 of the first slot 1111 and the third slot 1113 along a length direction of the slot 111 range from 1 mm to 3 mm, dimensions W3 of the first slot 1111 and the third slot 1113 in a width direction of the slot 111 gradually increase from an end of each of the first slot 1111 of the third slot 1113 connected with the second slot 111 to an end of each of the first slot 1111 of the third slot 1113 far away from the second slot 111, and maximum dimensions (i.e., maximum dimensions W3) along the width direction of the slot 111 range from 0.1 mm to 0.14 mm. A dimension L4 of the second slot 1112 in the length direction of the slot 111 ranges from 0.3 mm to 0.5 mm, and a dimension W4 of the second slot 1112 in the width direction of the slot 111 ranges from 10 microns to 30 microns. For example, the dimensions L3 of the first slot 1111 and the third slot 1113 in the length direction of the slot 111 are 2 mm, and the maximum dimensions (i.e., the maximum dimensions W3) in the width direction of the slot 111 are 0.12 mm. The dimension L4 of the second slot 1112 in the length direction of the slot 111 is 0.4 mm, and the dimension W4 of the second slot 1112 in the width direction of the slot 111 is 20 mm.

In an exemplary implementation, as shown in FIGS. 18 to 21, the conductive structure 12 may be a circular patch, the shape of the slot 111 is annular, and when the conductive structure 12 moves to the corresponding slot 111, an orthographic projection of the circular patch on the first substrate 101 covers an orthographic projection of the annular slot 111 on the first substrate 101.

Figure 13:
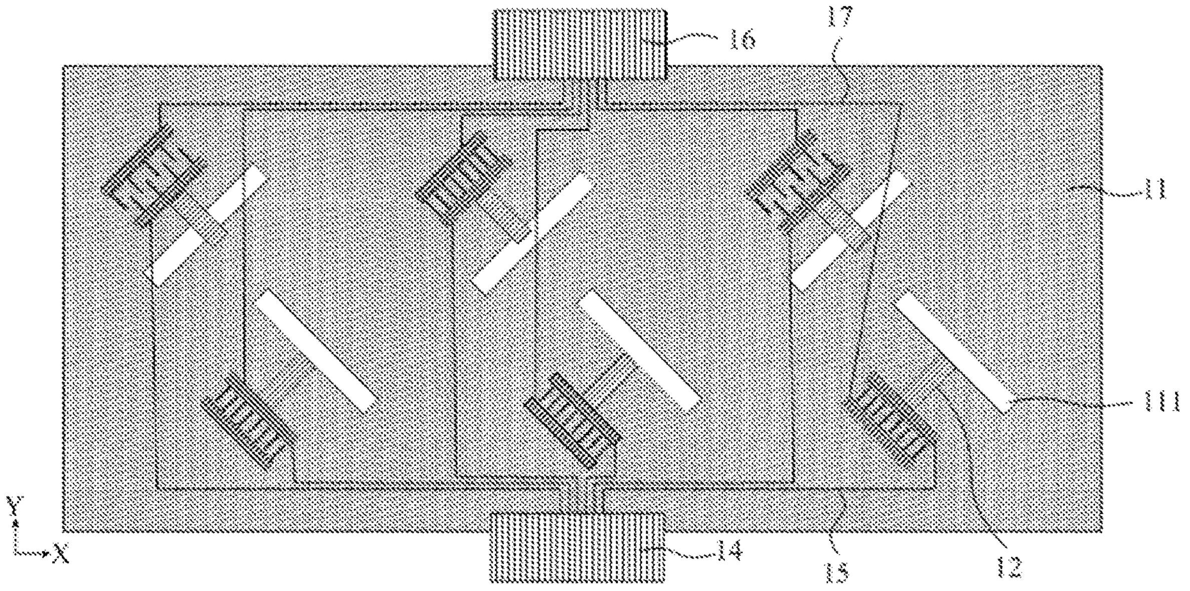
FIG. 13 is a schematic diagram of a planar structure of an antenna system according to an exemplary embodiment of the present disclosure.
Figure 14:
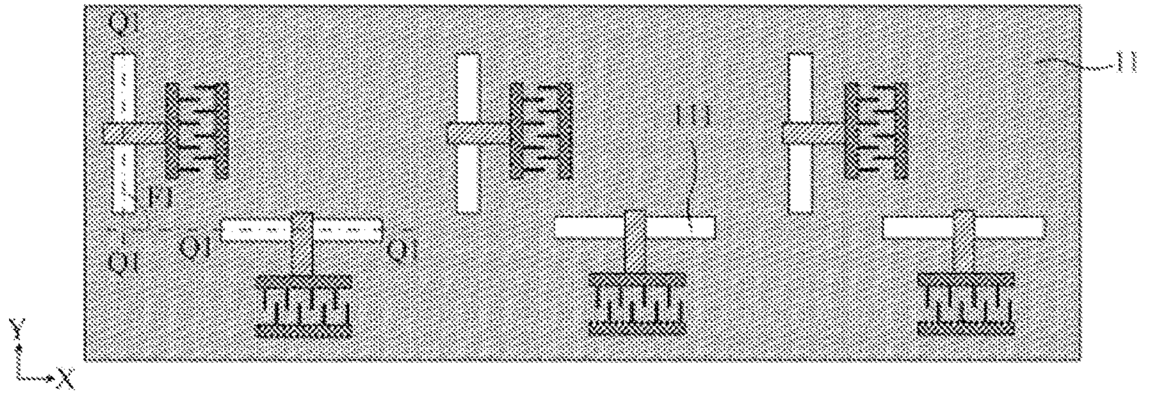
FIG. 14 is a schematic diagram of a planar structure of an antenna structure according to an exemplary embodiment of the present disclosure.
Figure 18:
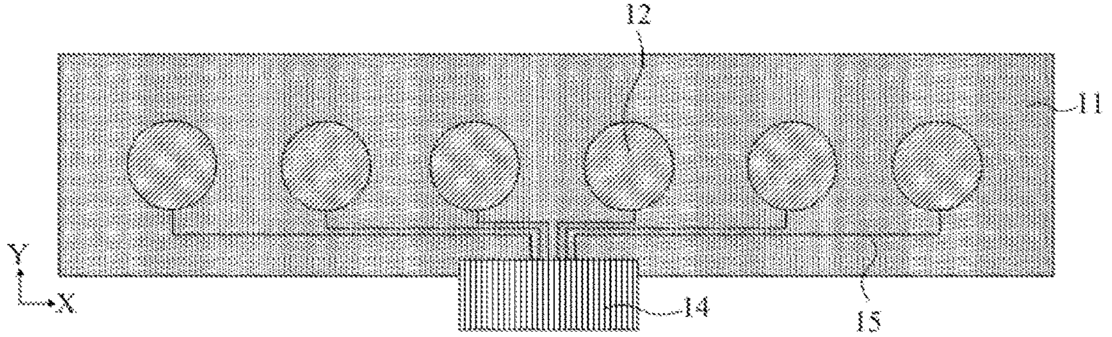
FIG. 18 is a schematic diagram of a planar structure of an antenna system according to an exemplary embodiment of the present disclosure.
Figure 19:
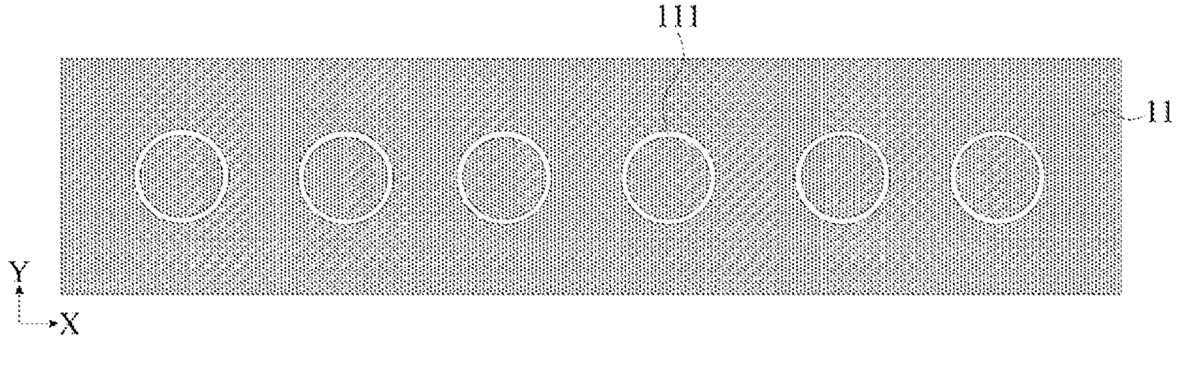
FIG. 19 is a schematic diagram of a planar structure of a first conductive layer according to an exemplary embodiment of the present disclosure.
Figure 20:
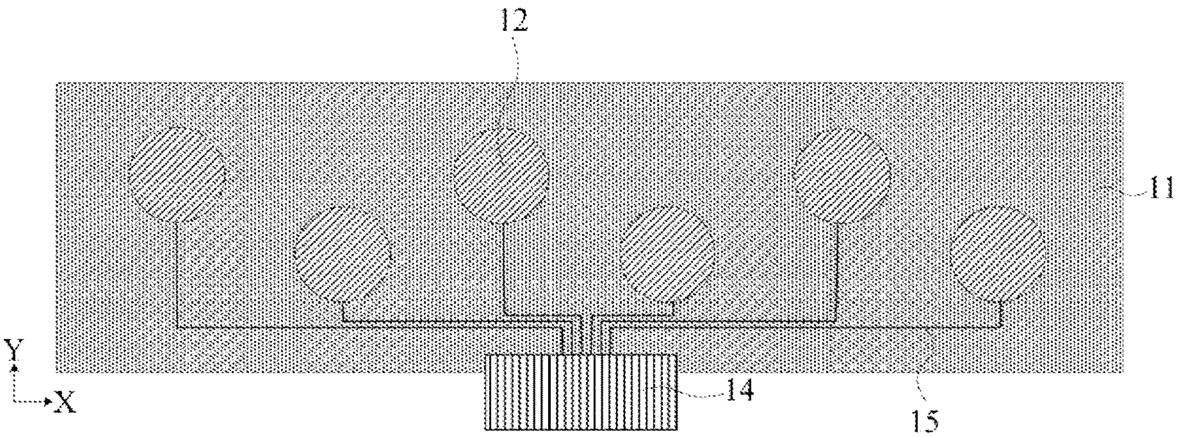
FIG. 20 is a schematic diagram of a planar structure of an antenna system according to an exemplary embodiment of the present disclosure.
Figure 21:
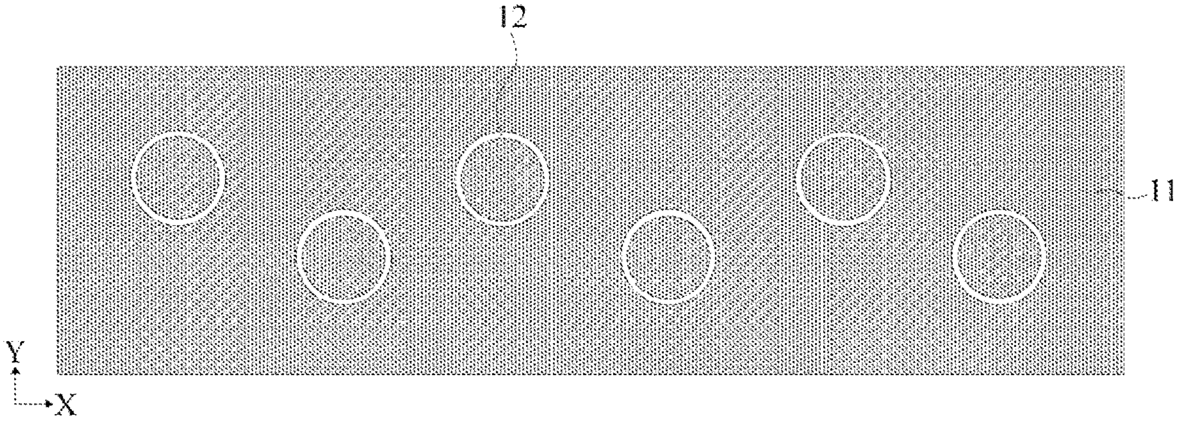
FIG. 21 is a schematic diagram of a planar structure of a first conductive layer according to an exemplary embodiment of the present disclosure.

As shown in FIGS. 13, 18 and 20, an antenna system including an antenna may include a first Flexible Printed Circuit (FPC for short) 14 and a first connection lead 15, wherein the first flexible printed circuit 14 may be disposed on the second substrate 102, and the conductive structure 12 is connected to the first flexible printed circuit 14 through the first connection lead 15. In other exemplary implementations, as shown in FIG. 13, the first connection lead 15 may be electrically connected with the support structure 132 in the switch structure 13 such that the support structure 132 is connected to the first flexible printed circuit 14 through the first connection lead 15, and the first flexible printed circuit 14 provides a second signal to the corresponding conductive structure 12 and the second comb structure 134 through the first connection lead 15 and the support structure 132.

In an exemplary implementation, as shown in FIG. 13, the antenna system may further include a second flexible printed circuit 16 and a second connection lead 17 that may be disposed on the second substrate 102, wherein the second connection lead 17 is electrically connected with the stator structure 131 and the second flexible printed circuit 16, the second flexible printed circuit 16 may provide a driving signal to the corresponding stator structure 131 through the second connection lead 17, and the driving signal is provided to a corresponding first comb structure 133 by the stator structure 131.

In an exemplary implementation, the first flexible printed circuit 14 and the second flexible printed circuit 15 may be a same flexible printed circuit. In an exemplary implementation, the first flexible printed circuit 14 or the second flexible printed circuit 15 may be electrically connected with the first conductive layer 11, and configured to provide the first signal to the first conductive layer 11.

Figure 22:
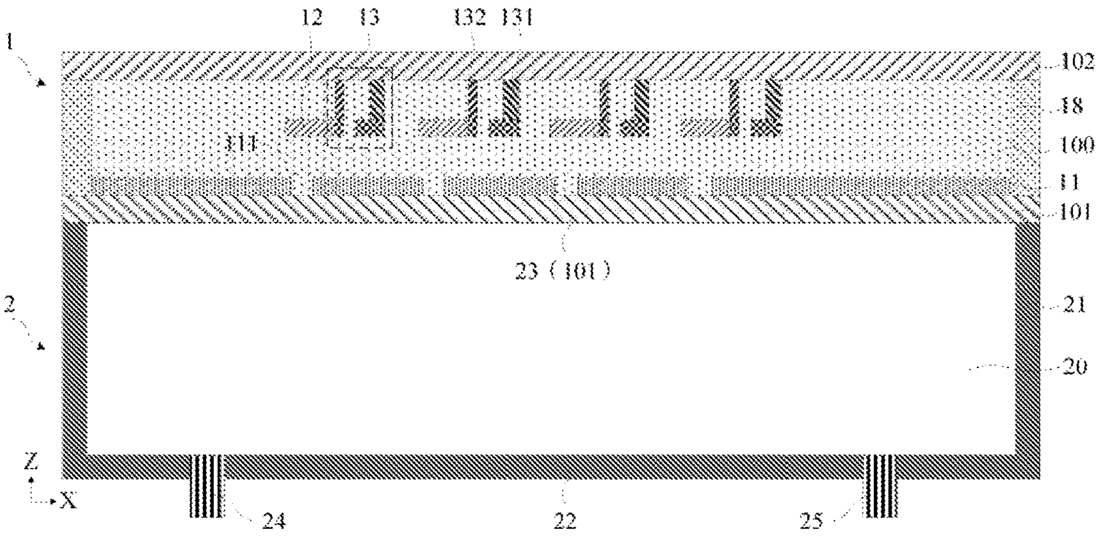
FIG. 22 is a schematic diagram of a sectional structure of an antenna according to an exemplary embodiment of the present disclosure.

In an exemplary implementation, as shown in FIG. 22, the antenna may further include a waveguide structure 2 disposed on a side of the first substrate 101 away from the second substrate 102, wherein the waveguide structure 2 includes a feed-in port and a feed-out port disposed on a side of the waveguide structure 2 away from the first substrate 101.

In an exemplary implementation, the waveguide structure 2 includes a waveguide cavity 20 encompassed by four side surfaces 21 (only left and right surfaces 21 are shown in the figure, and front and rear surfaces 21 are not shown), a top surface 23 and a bottom surface 22. The first substrate 101 serves as the top surface of the waveguide structure 2, and the feed-in port 24 and the feed-out port 25 are disposed on the bottom surface 22. In an exemplary implementation, the first substrate 101 may serve as the top face 23 of the waveguide structure 2, simultaneously. In an exemplary implementation, in the structure shown in FIG. 22, a reference wave enters the waveguide through the feed-in port 24, a portion of the reference wave is coupled and radiated by the antenna structure 1, and a portion of the reference wave is output by the feed-out port 25, and a load connected with the feed-out port 25 may be provided to absorb a wave output from the feed-out port 25 to prevent the reference wave from being affected due to reflection. In the antenna shown in FIG. 22, the antenna structure may include a plurality of conductive structures 12 and slots 111, only four conductive structures 12 and four slots 111 are shown in FIG. 22, and parts of the conductive structures 12 and slots 111 are omitted for convenience of display. In an exemplary implementation, the antenna structure may include 64 conductive structures 12 and 64 slots 111.

In an exemplary implementation, one of the conductive structures 12 corresponds to one of the slots 111 which may correspond to one or more of the conductive structures 12. As shown in FIGS. 1 to 4, 9 to 15, 18 and 20, one slot 111 corresponds to one conductive structure 12, and as shown in FIGS. 23 to 25, one slot 111 may correspond to a plurality of conductive structures 12.

Figure 23:
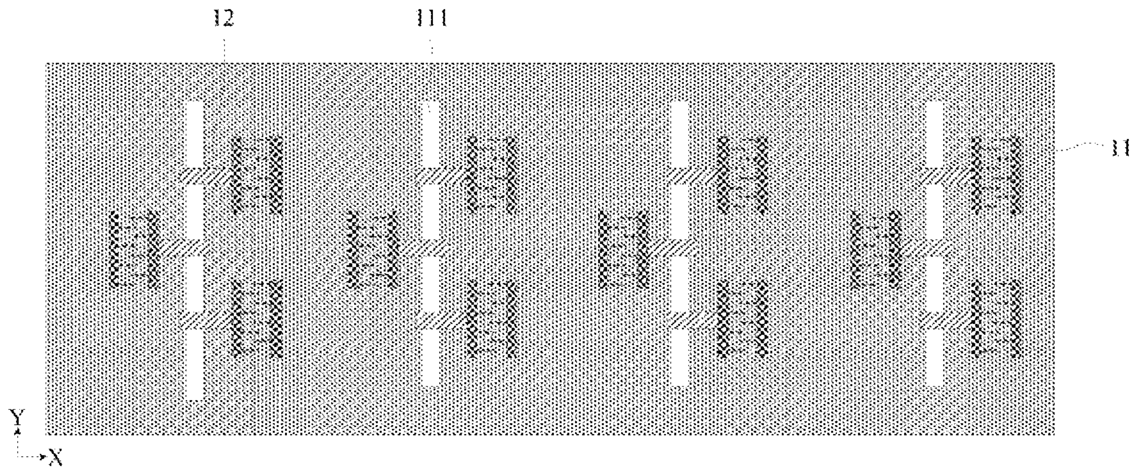
FIG. 23 is a schematic diagram of a planar structure of an antenna structure according to an exemplary embodiment of the present disclosure.
Figure 24:
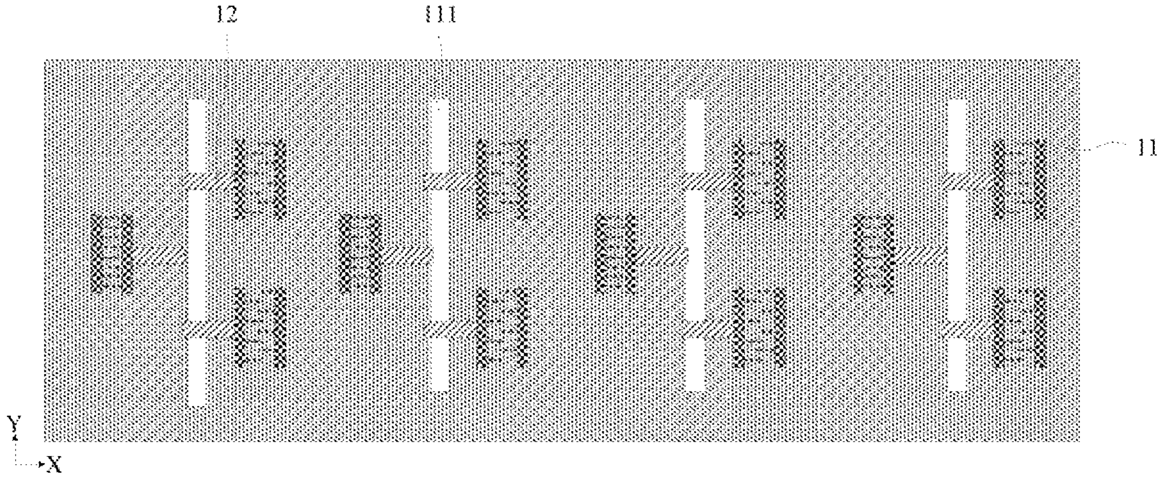
FIG. 24 is a schematic diagram of a planar structure of an antenna structure according to an exemplary embodiment of the present disclosure.
Figure 25:
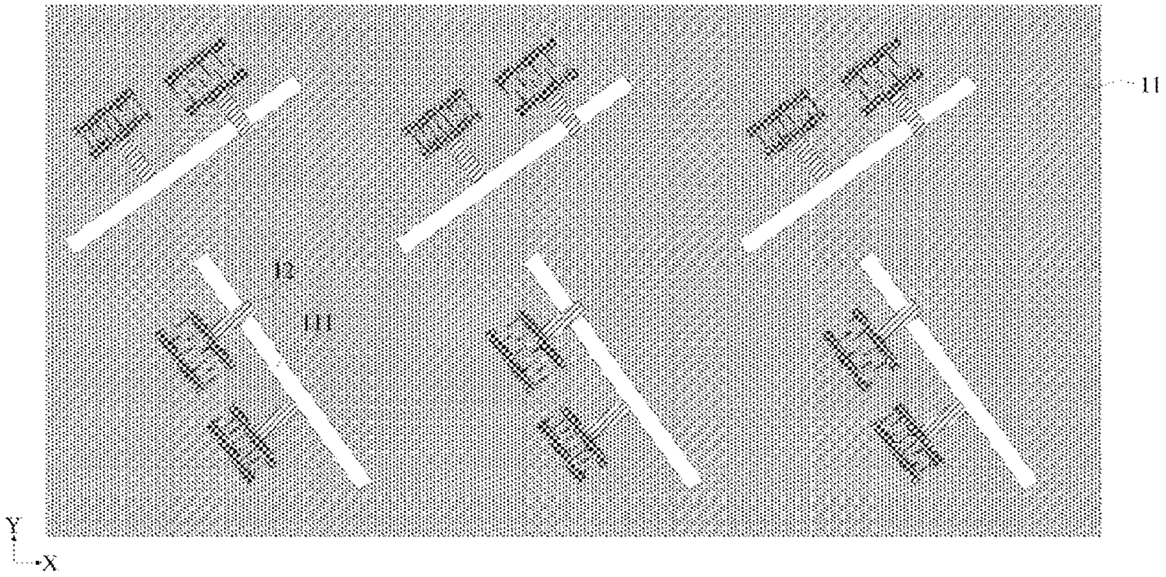
FIG. 25 is a schematic diagram of a planar structure of an antenna structure according to an exemplary embodiment of the present disclosure.

In an exemplary implementation, as shown in FIGS. 23 to 24, one slot 111 corresponds to a plurality of conductive structures 12, and any one conductive structure 12 can be moved away from or to the slot 111 under control of the switch structure 13, so that beam reconfiguration in a broadband range can be achieved, wherein a tuning frequency of an antenna structure shown in FIG. 23 is lower than a tuning frequency of an antenna structure shown in FIG. 24, and the structures shown in FIGS. 23 and 24 show different tuning states of a same antenna structure (quantities of conductive structures 12 moving to a position of the slot 111 are different). In a structure shown in FIG. 25, control of the broadband beams with linear polarization and circular polarization can be achieved.

In an exemplary implementation, the above-mentioned switch structure 13 may be provided as a Micro Electro Mechanical System (MEMS for short) switch structure.

Figure 26:
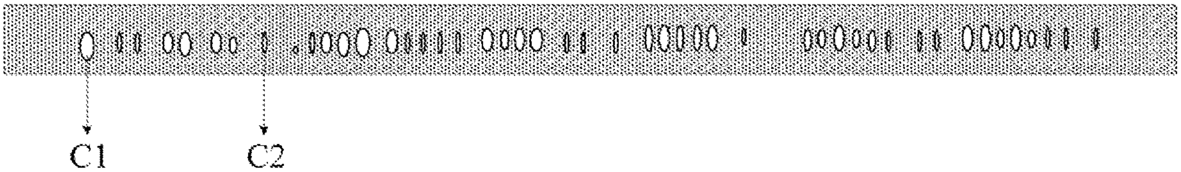
FIG. 26 is a schematic diagram of an energy radiation intensity of a plurality of radiation elements in an antenna structure.

In an exemplary implementation, in the antenna structure as shown in FIGS. 1 to 4, beam switching is performed by changing a moving state of the conductive structure 12 with an unchanged liquid crystal state. When the conductive structure 12 is located above the slot 111 and is not in a resonant state, energy is substantially not radiated. When the conductive structure 12 above the slot 111 is removed, energy is radiated out (in this state, a gap is not a resonant structure, but energy radiation is ensured in a certain frequency range). In an embodiment of the present disclosure, a conductive structure 12, a corresponding slot 111, and a liquid crystal between the conductive structure 12 and the corresponding slot 111 may be regarded as a radiation element (for example, MO in FIGS. 1 and 2 may be a radiation element). The antenna structure 1 may include a plurality of radiation elements (e.g. 64 radiation elements). FIG. 26 shows a schematic diagram of an energy radiation intensity of a plurality of radiation elements in the antenna structure 1, wherein C1 position shows a state in which the conductive structure 12 is far away from the slot 111 (i.e., the conductive structure 12 is not above the slot 111); and C2 position shows a state in which the conductive structure 12 moves to the slot 111 (i.e. the conductive structure 12 is located above the slot 111) and is not in the resonant state.

In the embodiment of the present disclosure, the conductive structure 12 moving away from the slot 111 can be understood as removal of the conductive structure 12 above the slot 111 away from the slot 111 and can be simply written as the removal of the conductive structure 12 away from the slot 111.

Figure 27:
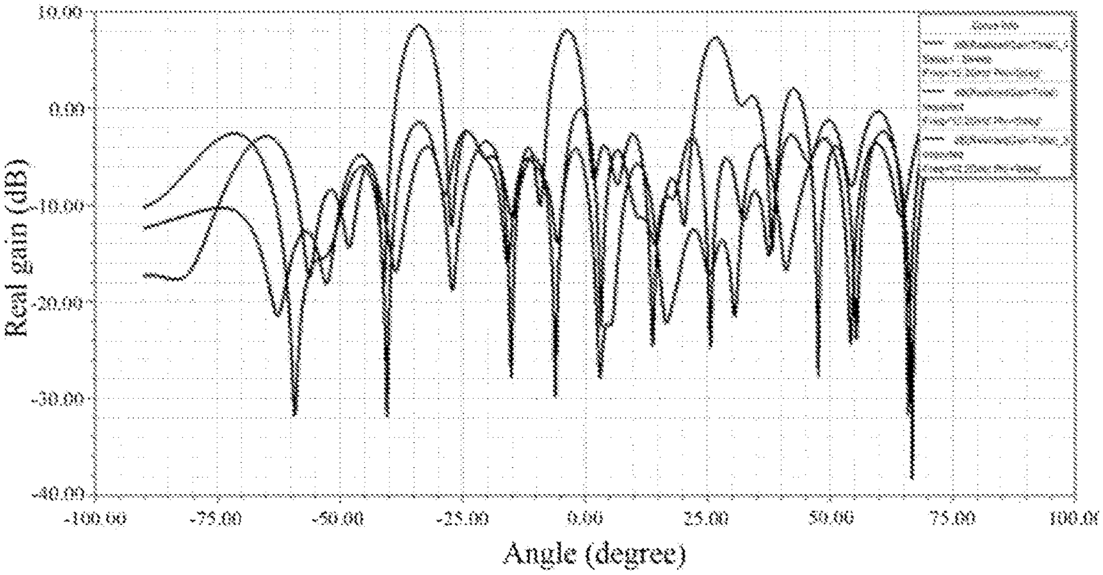
FIG. 27 shows a graph of simulation results of an antenna according to an exemplary embodiment of the present disclosure.
Figure 28:
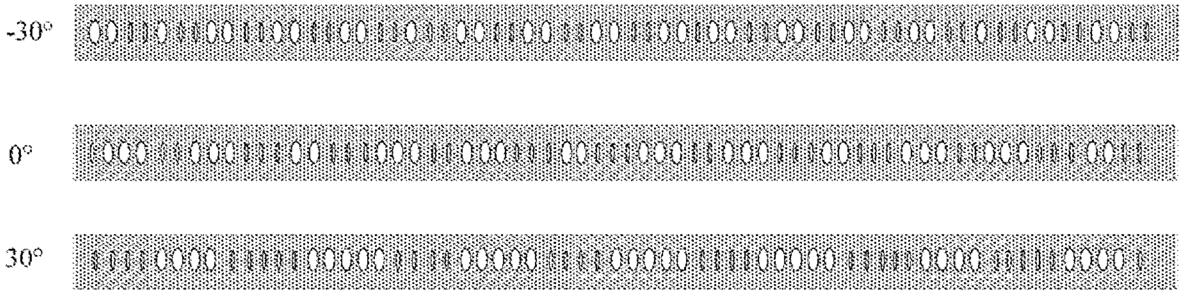
FIG. 28 is a schematic diagram of an energy radiation intensity of a plurality of radiation elements in the antenna in different beam directions.
Figure 29:
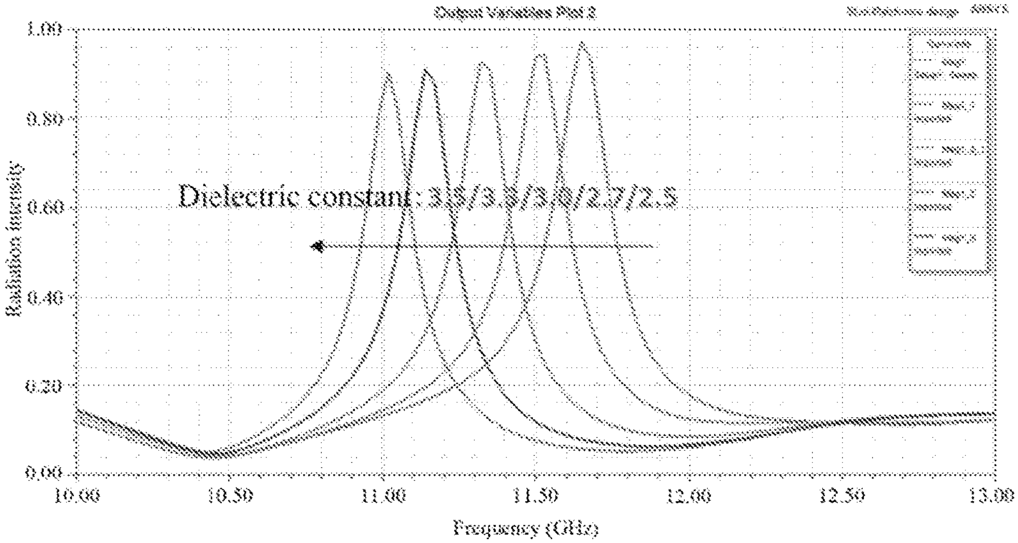
FIG. 29 shows a graph of a simulation result of radiation characteristics of each radiation element changed with a refractive index of liquid crystal in an exemplary embodiment of the present disclosure.

In an exemplary implementation, in the antenna structure shown in FIGS. 1 to 4, the antenna structure 1 including 64 radiation elements is described as an example. When the conductive structures 12 in all the radiation elements move to the position of the slot 111 (i.e. when the conductive structure 12 is located above the slot 111), a corresponding operating frequency is 12.2 GHz. When target beam directions are designed to be 0°, +300 and −30° respectively, a liquid crystal state in corresponding radiation elements is shown in table 1: '1' refers to 0 level or no level being applied (i.e. no voltage is applied to the conductive structure 12), and liquid crystal molecules in the corresponding radiation elements do not deflect, so that the corresponding radiation elements can radiate energy; '0' is a high level (i.e. a voltage is applied to the conductive structure 12), and the liquid crystal molecules corresponding to the radiation elements are deflected, so that the corresponding radiation elements radiate little or no energy. In each of the beam directions in the table 1, high and low levels are alternately applied to a plurality of conductive structures 12, so that liquid crystals in a plurality of radiation elements are in an alternating state, which can prevent polarization of the liquid crystals and does not affect a deflection state of the liquid crystals themselves. When the operating frequency is 12.2 GHz and the target beam direction is designed to be 0°, +300 and −30° respectively, three corresponding beam directions can be shown in FIG. 27, an energy radiation diagram of different radiation elements can be shown in FIG. 28, and an abscissa angle in FIG. 27 can be the beam direction or a deflection angle of the beam. A simulation result of radiation characteristics of each radiation element changed with a refractive index of the liquid crystal can be shown in FIG. 29.

TABLE 1

| Conductive structure serial number | Liquid crystal state of the target beam direction of −30° | Liquid crystal state of the target beam direction of 0° | Liquid crystal state of the target beam direction of 30° |
|---|---|---|---|
| 1 | 1 | 0 | 0 |
| 2 | 1 | 1 | 0 |
| 3 | 0 | 1 | 0 |
| 4 | 0 | 1 | 0 |
| 5 | 1 | 0 | 1 |
| 6 | 0 | 0 | 1 |
| 7 | 0 | 1 | 1 |
| 8 | 1 | 1 | 1 |
| 9 | 1 | 1 | 0 |
| 10 | 0 | 0 | 0 |
| 11 | 0 | 0 | 0 |
| 12 | 1 | 0 | 0 |
| 13 | 1 | 1 | 0 |
| 14 | 0 | 1 | 1 |
| 15 | 0 | 0 | 1 |
| 16 | 1 | 0 | 1 |
| 17 | 1 | 0 | 1 |
| 18 | 0 | 1 | 1 |
| 19 | 0 | 1 | 0 |
| 20 | 1 | 1 | 0 |
| 21 | 0 | 0 | 0 |
| 22 | 0 | 0 | 0 |
| 23 | 1 | 1 | 1 |
| 24 | 1 | 1 | 1 |
| 25 | 0 | 1 | 1 |
| 26 | 0 | 0 | 1 |
| 27 | 1 | 0 | 1 |
| 28 | 1 | 0 | 0 |
| 29 | 0 | 1 | 0 |
| 30 | 0 | 1 | 0 |
| 31 | 1 | 0 | 0 |
| 32 | 1 | 0 | 1 |
| 33 | 0 | 0 | 1 |
| 34 | 0 | 1 | 1 |
| 35 | 1 | 1 | 1 |
| 36 | 1 | 1 | 1 |
| 37 | 0 | 0 | 0 |
| 38 | 1 | 0 | 0 |
| 39 | 1 | 1 | 0 |
| 40 | 0 | 1 | 0 |
| 41 | 0 | 1 | 1 |
| 42 | 1 | 0 | 1 |
| 43 | 1 | 0 | 1 |
| 44 | 0 | 0 | 1 |
| 45 | 0 | 1 | 1 |
| 46 | 1 | 1 | 0 |
| 47 | 1 | 0 | 0 |
| 48 | 0 | 0 | 0 |
| 49 | 0 | 0 | 0 |
| 50 | 1 | 1 | 0 |
| 51 | 1 | 1 | 1 |
| 52 | 0 | 1 | 1 |
| 53 | 0 | 0 | 1 |
| 54 | 1 | 0 | 1 |
| 55 | 0 | 1 | 0 |
| 56 | 0 | 1 | 0 |
| 57 | 1 | 1 | 0 |
| 58 | 1 | 0 | 0 |
| 59 | 0 | 0 | 0 |
| 60 | 0 | 0 | 1 |
| 61 | 1 | 1 | 1 |
| 62 | 1 | 1 | 1 |
| 63 | 0 | 0 | 1 |
| 64 | 0 | 0 | 0 |

In an implementation of the present disclosure, different beam direction of the antenna structure 1 can be achieved by applying driving signals to switches of different radiation elements in the antenna structure 1 and applying a second signal to the conductive structure. For example, a same voltage can be applied to the support structure 132 and the stator structure 131 in the antenna structure shown in FIGS. 1 and 2, so that the first comb structure 133 and the second comb structure 134 have a same potential, and the switch structure 13 does not drive the conductive structure 12 away from the corresponding slot 111 (that is, all the conductive structures 12 are located above the corresponding slot 111). In this case, the target beam direction can be adjusted by the voltages applied to the conductive structure 12 respectively, so that the antenna can receive or transmit a beam in the target direction. Without adjusting the beam direction, the conductive structures 12 in all the radiation elements in the antenna structure 1 (one radiation element may be a structure corresponding to MO in FIGS. 1 and 2) can be removed from the corresponding slots 111 (that is, all the conductive structures 12 are not above the corresponding slots 111). When it is necessary to regulate the operating frequency and the beam direction of the antenna, the switching structure 13 can adjust the conductive structure 12 to move away from the slot 111 or move to a position above the slot 111 to adjust the operating frequency, and adjust the beam direction by regulating the voltage applied to the conductive structure 12. For example, in a state corresponding to a target operating frequency and a target beam direction, adjustment modes for one of the radiation elements MO can include, at least, the following four modes.

In a first mode, it is necessary to dispose the conductive structure 12 above the slot 111. When it is necessary to apply a voltage to the conductive structure 12, a voltage can be applied to the conductive structure 12 and the second comb structure 134 through the support structure 132, while a same voltage can be applied to the first comb structure 133 through the stator structure 131, so that there is no relative movement between the first comb structure 133 and the second comb structure 134, a voltage can be applied to the conductive structure 12, and the conductive structure 12 can be ensured to be located above the slot 111.

In a second mode, it is necessary to dispose the conductive structure 12 above the slot 111. Without applying voltage to the conductive structure, no voltage is applied to the support structure 132 or to the stator structure 131, so that the conductive structure 12 can be ensured to be positioned above the slot 111 without applying a voltage to the conductive structure 12.

In a third mode, it is necessary to move the conductive structure 12 away from the slot 111. Without applying voltage to the conductive structure 12, no voltage is applied to the support structure 132 and a voltage can be applied to the stator structure 131, so that the switch structure 13 drives the conductive structure 12 to move away from the slot 111. Therefore, the conductive structure 12 can be ensured to be moved away from the position above the slot 111 without applying a voltage to the conductive structure 12.

In a fourth mode, it is necessary to move the conductive structure 12 away from the slot 111. When it is necessary to apply a voltage to the conductive structure 12, a voltage can be applied to the support structure 132 and no voltage is applied to the stator structure 131, so that the switch structure 13 drives the conductive structure 12 to move away from the slot 111. Therefore, a voltage can be applied to the conductive structure 12, and the conductive structure 12 can be ensured to be moved away from the slot 111.

In the implementation of the present disclosure, no applied voltage can be understood as applying a 0V voltage. The second signal applied to the support structure 132 may include a first voltage and a second voltage, wherein the first voltage may be 0V, or it may be understood that no voltage is applied, and the second voltage may be a high voltage (e.g. 20V). A driving voltage applied to the stator structure 131 may include a first driving voltage and a second driving voltage, wherein the first driving voltage may be 0V, or it may be understood that no voltage is applied, and the second driving voltage may be the same as the second voltage applied to the conductive structure 12.

In the implementation of the present disclosure, by regulating a deflection angle of liquid crystal molecules between the conductive structure 121 and the corresponding slot 111, a refractive index of the liquid crystal is changed, and a phase of the antenna receiving or transmitting beam is regulated, so as to receive or transmit the beam directed to the target (i.e., the target direction). By applying a driving voltage to the switch structure so that the conductive structure 12 moves to or away from the corresponding slot 111, the operating frequency of the antenna structure can be controlled. In an implementation of the present disclosure, an effective dimension of the slot can affect a resonant frequency of a gap by changing an effective dimension of the slot of the antenna structure (adjusting conductive structures 12 in a plurality of radiation elements to move away from the corresponding slot 111 or move to a position above the corresponding slot 111, so as to achieve adjustment of the effective dimension of the slot), thus achieving the beam reconfiguration in a broadband range.

Figure 30:
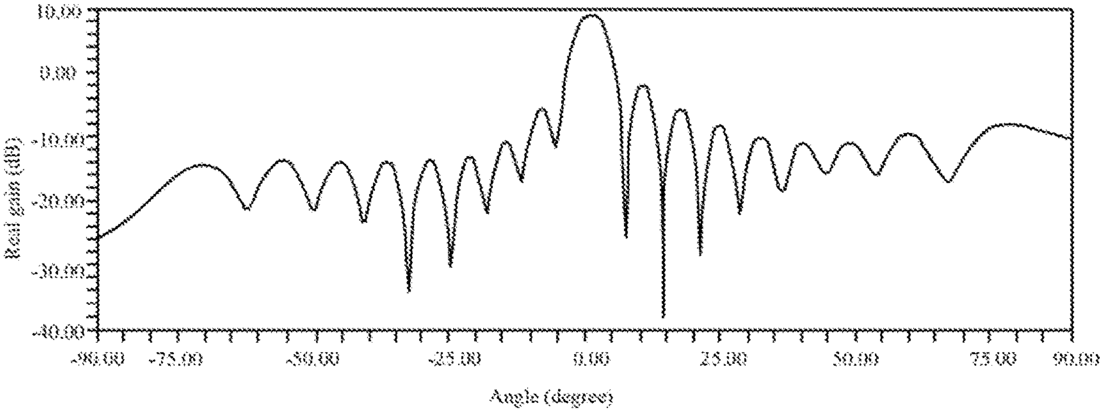

As shown in FIGS. 30 to 32, in order to achieve the control of the target beam direction at the target operating frequency (i.e., the target width range) by the driving voltage applied to the switch structure 13 and the second signal applied to the conductive structure 12, FIG. 30 shows regulation of the target beam direction to 0° at the target operating frequency, FIG. 31 shows regulation of the target beam direction to −30° at the target operating frequency, FIG. 32 shows regulation of the target beam direction to 30° at the target operating frequency, and abscissa angles in FIGS. 31 to 32 can be the target beam direction. Table 2 shows a state of 64 radiation elements in the antenna structure in which the beams are directed to the plurality of corresponding switch structures 13 shown in FIGS. 30 to 32, where 0 in table 2 represents that the switch structure 13 controls the radiation element MO to radiate no energy or radiates little energy, and 1 represents that the switch structure 13 controls the radiation element MO to radiate energy.

TABLE 2

| Conductive structure serial number | Switch structure state when the target beam points to −30° | Switch structure state when the target beam points to 0° | Switch structure state when the target beam points to 30° |
|---|---|---|---|
| 1 | 1 | 0 | 0 |
| 2 | 1 | 1 | 0 |
| 3 | 0 | 1 | 0 |
| 4 | 0 | 1 | 0 |
| 5 | 1 | 0 | 1 |
| 6 | 1 | 0 | 1 |
| 7 | 0 | 0 | 1 |
| 8 | 0 | 1 | 1 |
| 9 | 1 | 1 | 1 |
| 10 | 1 | 0 | 0 |
| 11 | 0 | 0 | 0 |
| 12 | 1 | 0 | 0 |
| 13 | 1 | 1 | 0 |
| 14 | 0 | 1 | 0 |
| 15 | 0 | 1 | 1 |
| 16 | 1 | 0 | 1 |
| 17 | 1 | 0 | 1 |
| 18 | 0 | 0 | 1 |
| 19 | 0 | 1 | 1 |
| 20 | 1 | 1 | 0 |
| 21 | 1 | 1 | 0 |

TABLE 2-continued

| Conductive structure serial number | Switch structure state when the target beam points to −30° | Switch structure state when the target beam points to 0° | Switch structure state when the target beam points to 30° |
|---|---|---|---|
| 22 | 0 | 0 | 0 |
| 23 | 0 | 0 | 0 |
| 24 | 1 | 1 | 0 |
| 25 | 1 | 1 | 1 |
| 26 | 0 | 1 | 1 |
| 27 | 0 | 0 | 1 |
| 28 | 1 | 0 | 1 |
| 29 | 1 | 0 | 1 |
| 30 | 0 | 1 | 0 |
| 31 | 0 | 1 | 0 |
| 32 | 1 | 1 | 0 |
| 33 | 1 | 0 | 0 |
| 34 | 0 | 0 | 0 |
| 35 | 0 | 0 | 1 |
| 36 | 1 | 1 | 1 |
| 37 | 1 | 1 | 1 |
| 38 | 0 | 0 | 1 |
| 39 | 0 | 0 | 1 |
| 40 | 1 | 0 | 0 |
| 41 | 1 | 1 | 0 |
| 42 | 0 | 1 | 0 |
| 43 | 0 | 1 | 0 |
| 44 | 1 | 0 | 0 |
| 45 | 1 | 0 | 1 |
| 46 | 0 | 0 | 1 |
| 47 | 1 | 1 | 1 |
| 48 | 1 | 1 | 1 |
| 49 | 0 | 0 | 1 |
| 50 | 0 | 0 | 0 |
| 51 | 1 | 0 | 0 |
| 52 | 1 | 1 | 0 |
| 53 | 0 | 1 | 0 |
| 54 | 0 | 1 | 0 |
| 55 | 1 | 0 | 1 |
| 56 | 1 | 0 | 1 |
| 57 | 0 | 0 | 1 |
| 58 | 0 | 1 | 1 |
| 59 | 1 | 1 | 1 |
| 60 | 1 | 1 | 0 |
| 61 | 0 | 0 | 0 |
| 62 | 0 | 0 | 0 |
| 63 | 1 | 1 | 0 |
| 64 | 1 | 1 | 1 |

In an implementation of the present disclosure, when all the conductive structures 12 in the antenna structure 1 are moved away from a position above the corresponding slots 111, each radiation element can radiate energy, but cannot scan the beam direction and cannot regulate the target beam direction.

In the table 2, "1" represents radiant energy, and "0" represents no radiant energy or little radiant energy. For a plurality of radiant elements MO, the following three cases are included.

In a first case, the conductive structure 12 is located above the slot 111. When a voltage is applied to the conductive structure 12, and corresponding liquid crystal molecules are deflected, energy radiated by the corresponding radiation element MO decreases or is not radiated even. When a voltage is applied to the conductive structure 12, and the corresponding liquid crystal molecules are not deflected, the corresponding radiation element MO can radiate energy.

In a second case, the conductive structure 12 is moved away from a position above the slot 111, and the corresponding radiation element MO can radiate energy. In a radiation element in which the conductive structure 12 is not moved away from a position above the slot 111, the applied and non-applied voltage are the same as those in the first case, respectively.

In a third case, a plurality of conductive structures 12 are located above the slot 111. Since different quantities of conductive structures 12 are located in a resonant cavity formed above the slot 111, corresponding resonant frequencies are different. Therefore, the switching structure 13 can be used to change the quantity of conductive structures above the slot 111 to tune the operating frequency of the antenna, and a beam direction received or transmitted by the antenna is adjusted by applying or not applying voltage to the conductive structure located above the slot, thus achieving beam direction reconfiguration at different resonant frequencies.

Figure 11:
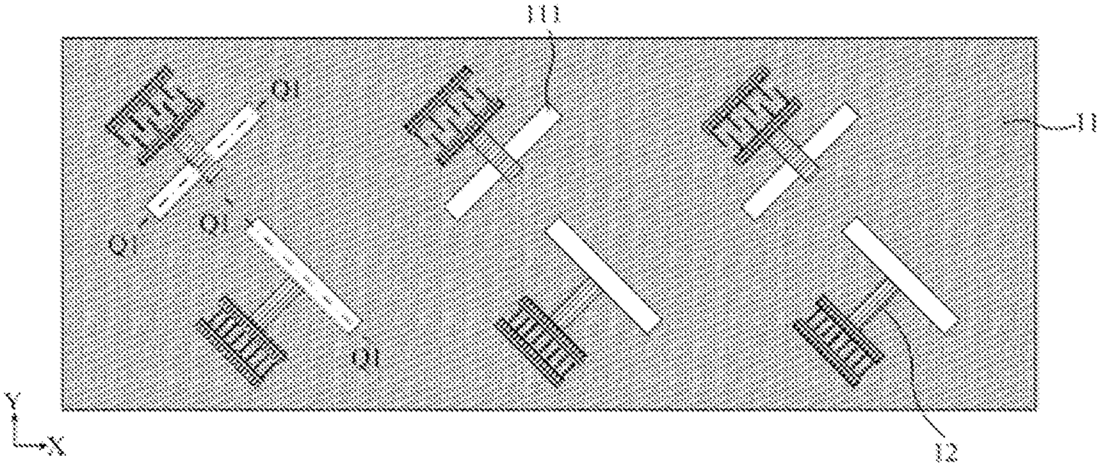
FIG. 11 is a schematic diagram of a planar structure of an antenna structure according to an exemplary embodiment of the present disclosure.
Figure 12:
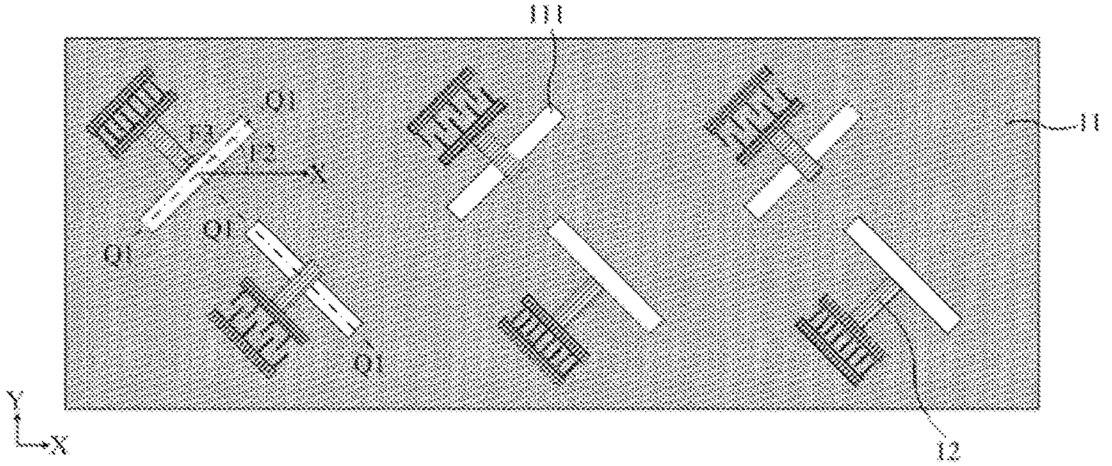
FIG. 12 is a schematic diagram of a planar structure of an antenna structure according to an exemplary embodiment of the present disclosure.

In the exemplary implementations, as shown in FIGS. 10 to 13, there are different regulation states of the antenna structure 1. For the structure in FIGS. 10 to 13, when the conductive structures 12 are all located above the slots 111, regulation of the beam direction with circular polarization can be achieved. FIG. 10 and FIG. 11 show regulation of a beam with two kinds of linear polarization. FIG. 12 shows regulation of a beam with circular polarization. FIG. 13 shows regulation of a beam with linear polarization.

An antenna system is also provided in an embodiment of the present disclosure, which may include a flexible printed circuit and the antenna described in any of the above embodiments, wherein the flexible printed circuit is electrically connected with the antenna. As shown in FIGS. 18 and 20, the antenna system may include a first Flexible Printed Circuit (FPC for short) 14 and a first connection lead 15, wherein the first flexible printed circuit 14 and the first connection lead 15 may be disposed on a second substrate 102, and a conductive structure 12 is connected to the first flexible printed circuit 14 through the first connection lead 15. In other exemplary implementations, as shown in FIG. 13, the first connection lead 15 may be electrically connected with the support structure 132 in the switch structure 13 such that the support structure 132 is connected to the first flexible printed circuit 14 through the first connection lead 15, and the first flexible printed circuit 14 provides a second signal to the corresponding conductive structure 12 and the second comb structure 134 through the first connection lead 15 and the support structure 132.

In an exemplary implementation, as shown in FIG. 13, the antenna system may further include a second flexible printed circuit 16 and a second connection lead 17 that may be disposed on the second substrate 102, wherein the second connection lead 17 is electrically connected with the stator structure 131 and the second flexible printed circuit 16, the second flexible printed circuit 16 may provide a driving signal to the corresponding stator structure 131 through the second connection lead 17, and the driving signal is provided to a corresponding first comb structure 133 by the stator structure 131.

In an exemplary implementation, the first flexible printed circuit 14 and the second flexible printed circuit 15 may be a same flexible printed circuit. In an exemplary implementation, the first flexible printed circuit 14 or the second flexible printed circuit 15 may be electrically connected with the first conductive layer 11, and configured to provide the first signal to the first conductive layer 11.

A method for driving an antenna is also provided in an embodiment of the present disclosure, wherein the antenna structure includes a first substrate, a second substrate disposed opposite to the first substrate, and a liquid crystal layer filled between the first substrate and the second substrate. A first conductive layer is provided on a side of the first substrate close to the second substrate, a plurality of slots are provided on the first conductive layer, and the slots penetrate through the first conductive layer in a direction perpendicular to a plane in which the first conductive layer is located. A plurality of switch structures and a plurality of conductive structures are provided on a side of the second substrate close to the first substrate, wherein the plurality of switch structures are connected to the plurality of conductive structures, respectively. The plurality of conductive structures correspond to the plurality of slots, respectively. A driving method may include the following acts.

A first signal is applied to a first conductive layer. A plurality of driving signals in a driving signal group corresponding to a target operating frequency are applied to the plurality of switch structures, respectively. A plurality of second signals in a voltage signal group corresponding to a target beam direction are applied to a plurality of conductive structures, respectively. The conductive structures are moved to or away from corresponding slots under control of the corresponding switch structures.

In an exemplary implementation, the switch structure may include a stator structure, a support structure, a first comb structure and a second comb structure, wherein the support structure and the stator structure are disposed on the second substrate, and a conductive structure is disposed at an end of the support structure away from the second substrate. The first comb structure is disposed at an end of the stator structure away from the second substrate. The second comb structure is disposed at an end of the support structure away from the second substrate. In an arrangement direction of the switch structure and the conductive structure, and in a plane parallel to the second substrate, the first comb structure and the second comb structure are located between the stator structure and the support structure, and the conductive structure and the second comb structure are located on both sides of the support structure.

The act of applying the plurality of driving signals in the driving signal group corresponding to the target beam direction to the plurality of switch structures, respectively, may include applying a plurality of driving signals in a driving signal group corresponding to the target beam direction to a plurality of stator structures, respectively, such that the driving signals are transmitted to the first comb structure via the stator structures.

The act of applying the plurality of second signals in the voltage signal group corresponding to a target beam direction to the plurality of conductive structures, respectively, may include applying second signals in a voltage signal group corresponding to a target beam direction to a plurality of support structures, respectively, such that the second signals are transmitted to the second comb structure and the conductive structure via the support structure.

In an embodiment of the present disclosure, at least one of a Microcontroller Unit (MCU for short), a Field Programmable Gate Array (FPGA for short) in which the MCU is also referred to as a Single Chip Microcomputer, and a single-chip computer can apply, respectively, a plurality of driving signals to a plurality of stator structures, and a plurality of second signals in a voltage signal group corresponding to a target beam direction to a plurality of support structures.

In an exemplary implementation, different beam directions may be designed using a holographic principle to calculate a field strength of an interference field formed by a reference wave and an object wave, so as to determine whether a voltage is applied to a patch corresponding to each gap of the antenna. The field strength expresses as follows:

$$\Psi_{obj}(\vec{r};\theta_0,\varphi_0)=\exp(-ik_0(\theta_0,\varphi_0)\cdot\vec{r});$$

$$\Psi_{ref}(\vec{r})=\exp\left(-ik_g\cdot\vec{r}\right);$$

where $\psi_{obj}(\vec{r};\theta_0,\varphi_0)$ is an object wave function, $\psi_{ref}(\vec{r})$ is a reference wave function. A space coordinate system is established by taking a feed-in point of the waveguide cavity as an origin; r is a distance from any point to the origin of the coordinate system; i is a serial number of any gap, wherein i=1, 2, 3 . . . N, and N is a total number of gaps; $\theta_0$ is a pitch angle of any point in the coordinate system; $\varphi_0$ is a direction angle of any point in the coordinate system, $k_0$ is an air wave vector of the object wave, $k_g$ is a reference wave vector. An interference pattern on the front (which can be referred to as an interference pattern of the object wave and the reference wave, and can be referred to as a holographic interference formula or an interference field expression) obtained by using the holographic principle is as follows:

$$\Psi_{intf}=\Psi_{obj}\Psi^{*}_{ref};$$

$$\Psi_{intf}(\vec{r};\theta_0,\varphi_0)=\exp\left(-ik_f(\theta_0,\varphi_0)\cdot\vec{r}\right)\exp\left(ik_g\cdot\vec{r}\right);$$

where $k_f$ is an object wave vector, values of $k_f$ and $k_0$ can be the same, that is, $k_f=k_0$.

An amplitude sampling function is used to analyze the interference pattern of the object wave and the reference wave, an amplitude sampling function is obtained as follows:

$$m(\vec{r};\theta_0,\varphi_0)=\frac{\mathrm{Re}\left(\Psi_{intf}(\vec{r};\theta_0,\varphi_0)\right)+1}{2}=\frac{\cos\left((k_g-k_f(\theta_0,\varphi_0))\cdot\vec{r}\right)+1}{2}$$

A far-field radiation pattern (which can be called the far-field radiation direction function) is calculated by putting above amplitude samples into the following formula:

$$\vec{H}_{rad}=H_0\frac{\omega^2}{4\pi r}e^{-jkr}\cos\theta\sum_{i=1}^{N}e^{-a_f x_i}m\left(\vec{r};\theta_0,\varphi_0\right)e^{-jk_g x_i}e^{jk_f x_i \sin\varphi};$$

$$a_f=\frac{\omega\mu_0}{4D_sA_c}\frac{\sin\left((k_g-k_f(\theta_0,\varphi_0))\cdot\vec{r}\right)}{\mathrm{Re}\{\eta\}};$$

Where $H_0$ is an amplitude coefficient, ω is a resonant frequency, j is a cosine imaginary number of the amplitude sampling function, $k=k_0$, $x_i$ represents a position coordinates of an i-th gap, $a_f$ is an attenuation constant, cos θ=1, φ is a scanning angle, $\mu_0$ is a permeability of air, Ds is is an arrangement period of gaps, Ac is a cross-sectional area of the waveguide cavity, and η is a propagation wave impedance in the waveguide cavity.

The analysis using the phase sampling function is as follows:

$$m\left(\vec{r};\theta_0,\varphi_0\right)=\arg\left(\Psi_{intf}(\vec{r};\theta_0,\varphi_0)\right)=-k_f(\theta_0,\varphi_0)\cdot\vec{r}+k_g\cdot\vec{r};$$

-continued $$m(\vec{r};\theta_0,\varphi_0)=\min(\alpha_D-\alpha_L);$$

$$\text{abs}(m(\vec{r};\theta_0,\varphi_0))\leq \text{phase\_threshold};$$

Where abs is an absolute value algorithm and phase_threshold is a phase threshold.

Using an Euclidean modulation (amplitude+phase) sampling function to analyze, a Lorentz limited correction modulation function is obtained as follows:

$$\alpha_L=\frac{j+e^{j\Psi_{int\,f}}}{2};$$

the amplitude sampling function is transformed to:

$$m(\vec{r};\theta_0,\varphi_0)=\min(\alpha_D-\alpha_L);$$

where $\alpha_D$ is an ideal value, and $\alpha_L$ is a numeric sequence.

A method for manufacturing an antenna is also provided in an embodiment of the present disclosure, as shown in FIG. 33, the method may include the following acts.

A first substrate and a second substrate are manufactured, a first conductive layer is formed on a side of the first substrate, a plurality of slots are disposed on the first conductive layer, and the slots penetrate through the first conductive layer in a direction perpendicular to a plane where the first conductive layer is located. A plurality of switch structures and a plurality of conductive structures are formed on a side of the second substrate, wherein the plurality of switch structures are connected with the plurality of conductive structures, respectively.

The first substrate and the second substrate are aligned, so that the first conductive layer is located on a side of the first substrate close to the second substrate, a plurality of switch structures and a plurality of conductive structures are located on a side of the second substrate close to the first substrate, the plurality of conductive structures correspond to the plurality of slots, respectively, and the conductive structures are moved to or away from the corresponding slots under control of the corresponding switch structures.

Liquid crystal is filled between the first substrate and the second substrate to form a liquid crystal layer.

As shown in FIG. 33, the manufacturing method may include acts S1 to S3.

In act S1, a first substrate and a second substrate are manufactured, a first conductive layer is formed on a side of the first substrate, a plurality of slots are formed on the first conductive layer, and the slots penetrate through the first conductive layer in a direction perpendicular to a plane where the first conductive layer is located. A plurality of switch structures and a plurality of conductive structures are formed on a side of the second substrate, wherein the plurality of switch structures are connected with the plurality of conductive structures, respectively.

In act S2, the first substrate and the second substrate are aligned, so that the first conductive layer is located on a side of the first substrate close to the second substrate, a plurality of switch structures and a plurality of conductive structures are located on a side of the second substrate close to the first substrate, the plurality of conductive structures correspond to the plurality of slots, respectively, and the conductive structures are moved to or away from the corresponding slots under control of the corresponding switch structures.

In act S3, liquid crystal is filled between the first substrate and the second substrate to form a liquid crystal layer.

In an exemplary implementation, the switch structure may include a stator structure, a support structure, a first comb structure a second comb structure. In act S1, the act of forming the plurality of switch structures and the plurality of conductive structures on the side of the second substrate may include acts S11 and S12.

In act S11, a stator structure and a support structure are formed on a side of the second substrate.

In act S12, a first comb structure, a second comb structure and a conductive structure are formed on a side of the stator structure and the support structure away from the second substrate. In an arrangement direction of the switch structure and the conductive structure, and in a plane parallel to the second substrate, the first comb structure and the second comb structure are located between the stator structure and the support structure, and the conductive structure and the second comb structure are located on both sides of the support structure.

Figure 34:
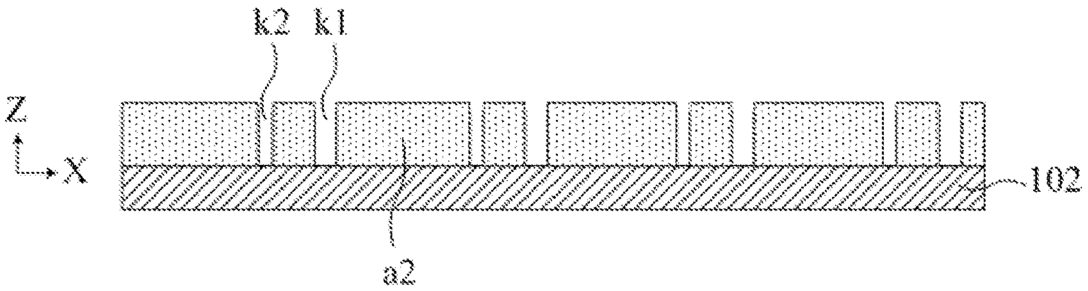
FIG. 34 is a schematic diagram of a sectional structure after forming a pattern of a second insulating layer according to an exemplary embodiment of the present disclosure.
Figure 35:
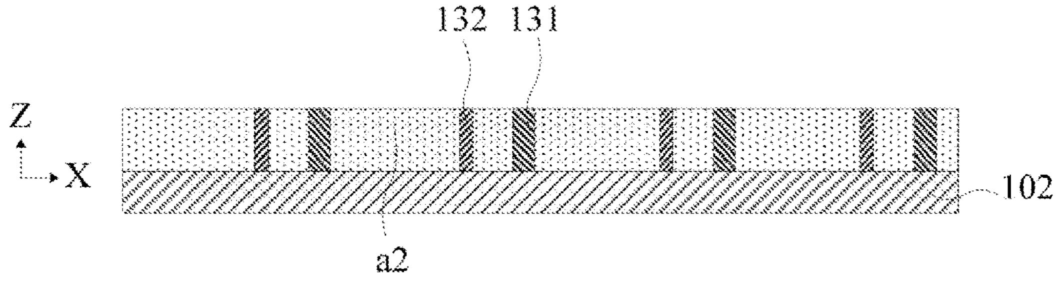
FIG. 35 is a schematic diagram of a sectional structure after forming a support structure and a stator structure according to an exemplary embodiment of the present disclosure.
Figure 36:
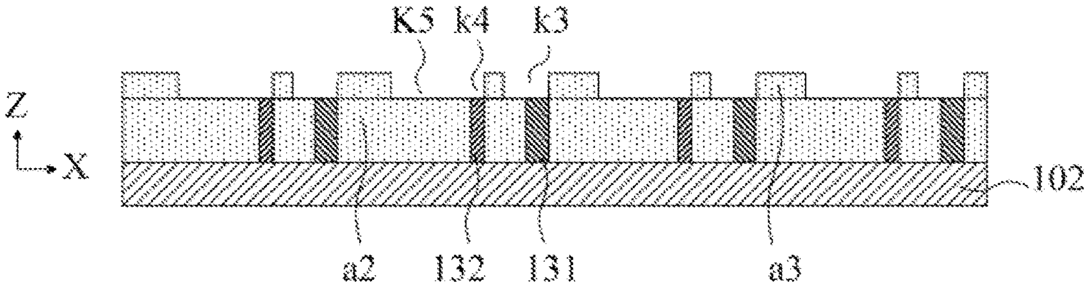
FIG. 36 is a schematic diagram of a sectional structure after forming a pattern of a third insulating layer according to an exemplary embodiment of the present disclosure.

In an exemplary implementation, in act S11 of forming the stator structure and the support structure on the side of the second substrate, as shown in FIGS. 34 to 36, may include acts S111 to S112.

In act S111, a second insulating layer a2 is formed on a side of the second substrate 102, the second insulating layer is patterned by a patterning process to form a second insulating layer pattern, wherein the second insulating layer pattern includes a first opening k1 forming a stator structure 131, and a second opening k2 forming a support structure 132, as shown in FIG. 34.

In act S112, a support structure 132 formed in the first opening k1 and a stator structure 131 formed in the second opening k2 are formed on a side of the second insulating layer a2 away from the second substrate 102, as shown in FIG. 35.

The act S12 of forming the first comb structure, the second comb structure and the conductive structure on the side of the stator structure and the support structure away from the second substrate may include acts S121 and S122.

Figure 37:
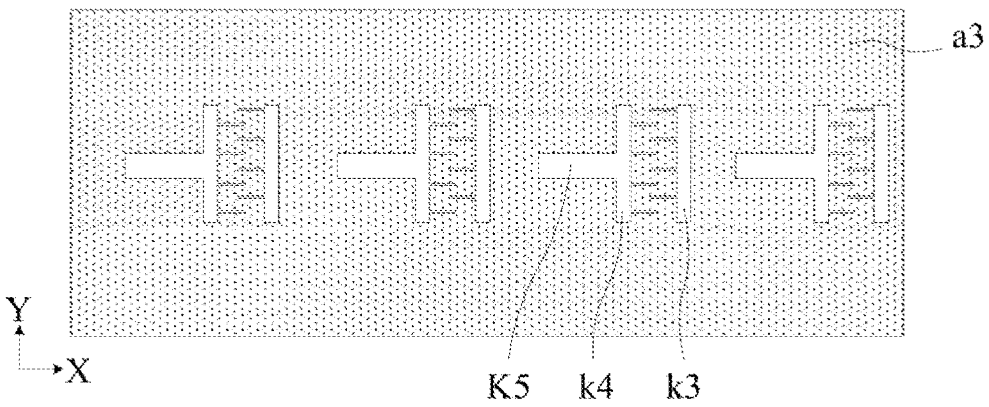
FIG. 37 is a schematic diagram of a sectional structure of a third insulating layer according to an exemplary embodiment of the present disclosure.

In act S121, a third insulating layer a3 is formed on the second insulating layer a2, the third insulating layer is patterned by a patterning process to form a third insulating layer pattern, and the third insulating layer pattern includes a third opening k3 forming a first comb structure 133, a fourth opening k4 forming a second comb structure 134, and a fifth opening k5 forming a conductive structure 12, as shown in FIG. 36. A planar structure of the third insulating layer pattern may be shown in FIG. 37.

Figure 38:
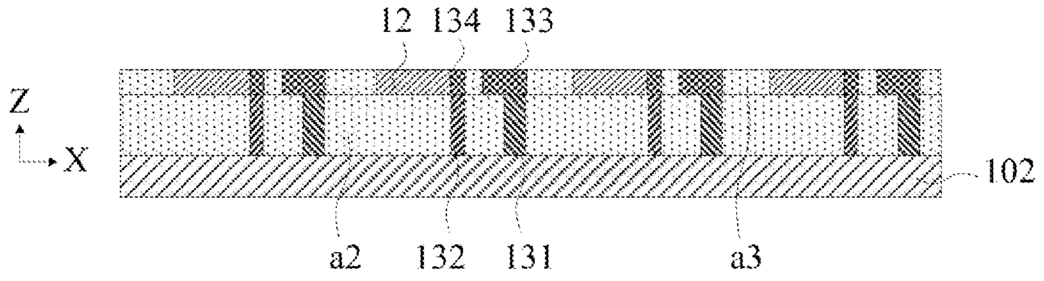
FIG. 38 is a schematic diagram of a sectional structure after forming a first comb structure, a second comb structure and a conductive structure according to an exemplary embodiment of the present disclosure.

In act S122, a first comb structure 133, a second comb structure 134 and a conductive structure 12 are formed on a side of the third insulating layer a3 away from the second insulating layer a2, wherein the first comb structure 133 is formed in a third opening k3, the second comb structure 134 is formed in a fourth opening k4, and the conductive structure 12 is formed in a fifth opening k5, as shown in FIG. 38. A schematic diagram of a planar structure of the formed first comb structure 133, the second comb structure 134 and the conductive structure 12 may be shown in FIG. 2.

Figure 39:
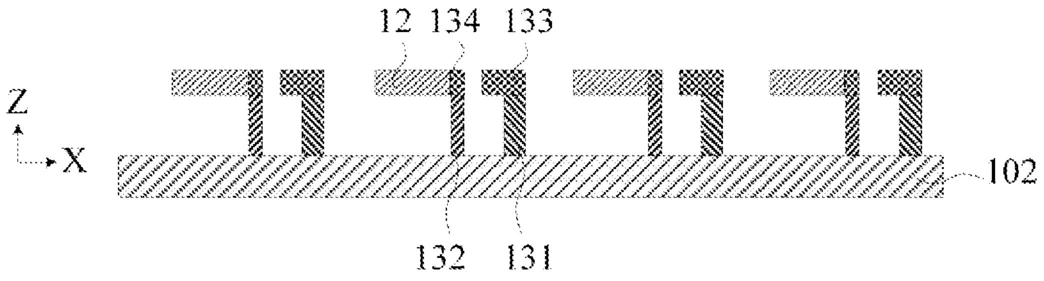
FIG. 39 is a schematic diagram of the sectional structure of a second substrate after removing the second insulating layer and the third insulating layer.

After the first comb structure, the second comb structure and the conductive structure are formed on the side of the stator structure and the support structure away from the second substrate, the second insulating layer a2 and the third insulating layer a3 may be removed to form the second substrate 102 as shown in FIG. 39.

In an exemplary implementation, the switch structure 13 may further include a fixing structure, and act S111 may further include the following acts S1110 to S1111 before the act of forming the second insulating layer on one side of the second substrate.

Figure 40:
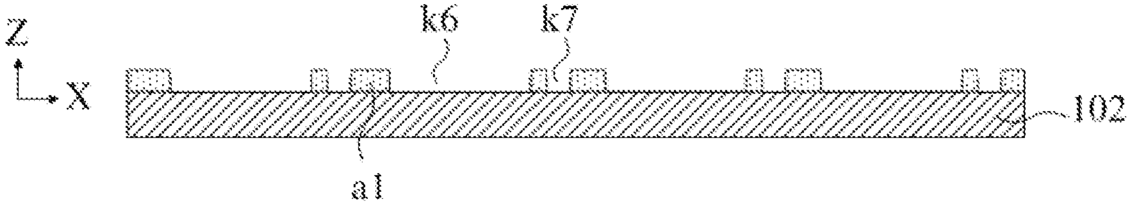
FIG. 40 is a schematic diagram of a sectional structure after forming a pattern of a first insulating layer according to an exemplary embodiment of the present disclosure.

In act S1110, a first insulating layer a1 is formed on the second substrate 102, the first insulating layer is patterned by a patterning process to form a first insulating layer pattern, wherein the first insulating layer pattern includes a sixth opening k6 of a fixing structure 137 and a seventh opening k7 forming a seed layer of the stator structure 131, as shown in FIG. 40.

Figure 41:
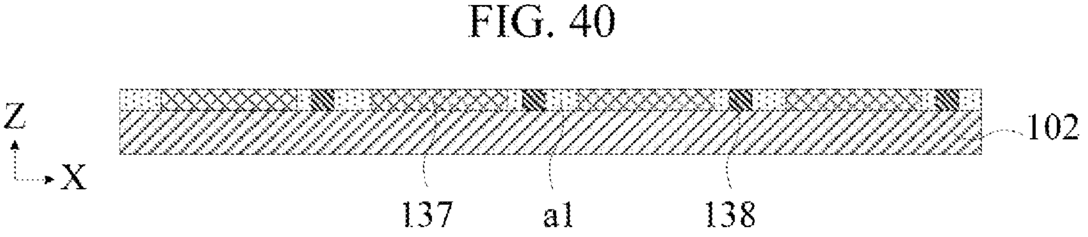
FIG. 41 is a schematic diagram of a sectional structure after forming a fixing structure, a stator structure and a seed layer of the stator structure according to an exemplary embodiment of the present disclosure.

In act S1111, the fixing structure 137 and the seed layer 138 of the stator structure 131 are formed on a side of the first insulating layer a1 away from the second substrate 102, wherein the fixing structure 137 is formed at the sixth opening k6, and the seed layer 138 is formed at the seventh opening k7, as shown in FIG. 41.

Figure 42:
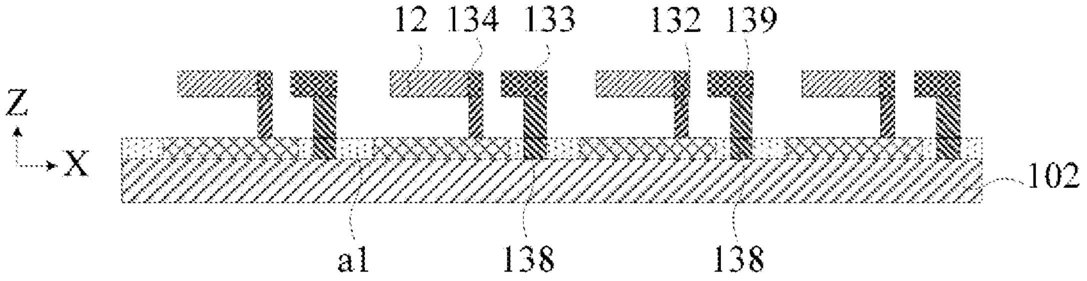
FIG. 42 is a schematic diagram of a sectional structure diagram of a second substrate after removing a first insulating layer, a second insulating layer and a third insulating layer according to an exemplary embodiment of the present disclosure.

In act S111, forming the second insulating layer on one side of the second substrate 102 may include forming a second insulating layer a2 on the side of the first insulating layer a1 away from the second substrate 102, wherein forming the second insulating layer pattern on the second insulating layer a2 and subsequent processes which are the same as those in FIGS. 34 to 39 and will not be described in detail here. Differing from FIG. 39, the stator structure 131 is composed of a seed layer 138 and a growth layer 139. As shown in FIG. 42, the stator structure 131 is a schematic diagram of a cross-sectional structure after removing the first insulating layer, the second insulating layer and the third insulating layer.

According to the antenna, the driving method, the manufacturing method and the antenna system provided in the embodiments of the present disclosure, wherein the antenna structure includes a first substrate, a second substrate disposed opposite to the first substrate, and a liquid crystal layer filled between the first substrate and the second substrate. A first conductive layer is provided on a side of the first substrate close to the second substrate, a plurality of slots are provided on the first conductive layer, and the slots penetrate through the first conductive layer in a direction perpendicular to a plane in which the first conductive layer is located. A plurality of switch structures and a plurality of conductive structures are provided on a side of the second substrate close to the first substrate, wherein the plurality of switch structures are connected to the plurality of conductive structures, respectively. The plurality of conductive structures correspond to the plurality of slots, respectively. The first conductive layer is configured to receive a first signal, the plurality of conductive structures are configured to receive a plurality of second signals in a voltage signal group corresponding to the target beam direction, and the switch structure is configured to receive a plurality of driving signals in a driving signal group corresponding to the target operating frequency.

The drawings of the embodiments of the present disclosure only involve structures involved in the embodiments of the present disclosure, and other structures may refer to usual designs.

The embodiments of the present disclosure, that is, features in the embodiments, may be combined with each other to obtain new embodiments if there is no conflict.

Although the implementations disclosed in the embodiments of the present disclosure are described above, the described contents are only implementations used for facilitating understanding of the embodiments of the present disclosure, which are not intended to limit the embodiments of the present disclosure. Any person skilled in the art to which the embodiments of the present disclosure pertain may make any modifications and variations in forms and details of implementation without departing from the spirit and scope disclosed in the embodiments of the present disclosure. Nevertheless, the scope of patent protection of the embodiments of the present disclosure shall still be subject to the scope defined by the appended claims.

The invention claimed is:

1. An antenna including an antenna structure, wherein the antenna structure comprises a first substrate, a second substrate disposed opposite to the first substrate, and a liquid crystal layer filled between the first substrate and the second substrate, wherein a first conductive layer is provided on a side of the first substrate close to the second substrate, a plurality of slots are provided on the first conductive layer, and the plurality of slots penetrate through the first conductive layer in a direction perpendicular to a plane in which the first conductive layer is located; a plurality of switch structures and a plurality of conductive structures are provided on a side of the second substrate close to the first substrate, wherein the plurality of switch structures are connected to the plurality of conductive structures, respectively; the plurality of conductive structures correspond to the plurality of slots, respectively, and a conductive structure of the plurality of conductive structures is moved to or away from a corresponding slot under control of a corresponding switch structure of the plurality of switch structures.

2. The antenna according to claim 1, wherein an orthographic projection of the conductive structure on the first substrate is overlapped, at least partially, with an orthographic projection of the corresponding slot on the first substrate when the conductive structure moves to the corresponding slot; the orthographic projection of the conductive structure on the first substrate is not overlapped, at least partially, with the orthographic projection of the corresponding slot on the first substrate when the conductive structure moves away from the corresponding slot.

3. The antenna according to claim 2, wherein the plurality of conductive structures are arranged along a first direction and the plurality of slots are arranged along the first direction in a plane parallel to the antenna structure.

4. The antenna according to claim 3, wherein the conductive structure is a rectangular patch, a shape of a slot of the plurality of slots is a rectangle slot or a butterfly-shaped slot; when the conductive structure moves to the corresponding slot, an orthographic projection of a rectangular patch on the first substrate covers an orthographic projection of a middle part of the slot on the first substrate.

5. The antenna according to claim 4, wherein a length of the rectangular patch ranges from 0.2 mm to 0.8 mm, and a width of the rectangular patch ranges from 0.2 mm to 0.4 mm;

a width of the rectangular slot ranges from 0.05 mm to 0.15 mm, and a length of the rectangular slot ranges from 4.5 mm to 6 mm; or the butterfly-shaped slot comprises a first slot, a second slot and a third slot that communicate in turn, wherein the first slot and the third slot are symmetrical with respect to the second slot; dimensions of the first slot and the third slot along a length direction of the slot range from 1 mm to 3 mm, dimensions of the first slot and the third slot in a width direction of the slot gradually increase from an end of each of the first slot of the third slot connected with the second slot to an end of each of the first slot of the third slot far away from the second slot, and maximum dimensions along the width direction of the slot range from 0.1 mm to 0.14 mm; a dimension of the second slot in the length direction of the slot ranges from 0.3 mm to 0.5 mm, and a dimension of the second slot in the width direction of the slot ranges from 10 microns to 30 microns.

6. The antenna according to claim 2, wherein the plurality of conductive structures comprise at least two rows of row conductive structures, and there are a plurality of row conductive structures in any row of the at least two rows of the row conductive structures; the plurality of slots comprise at least two rows of row slots, and there are a plurality of row slots in any row of the at least two rows of row slots; in a plane parallel to the antenna structure, the plurality of row conductive structures in any one row are arranged along a first direction, the plurality of row slots in any row are arranged along the first direction, two adjacent rows of the row conductive structures are disposed staggerly, and two adjacent rows of the row slots are disposed staggerly.

7. The antenna according to claim 6, wherein first center lines of two adjacent rows of the row slots are parallel to each other, or form a first intersection angle, and an extension direction of the first center lines coincide with an extension direction of a long side of the row slots.

8. The antenna according to claim 7, wherein the first intersection angle is 90°; in a plane parallel to the antenna structure and in two adjacent rows of the row slots, the first center line of one row of the row slots extends in a second direction and the first center line of another row of the row slots extends in the first direction; alternatively, in two adjacent rows of the row slots, the first center line of one row of the row slots and the first direction form an angle of 45°, and the first center line of another row of the row slots and the first direction form an angle of 135°.

9. The antenna according to claim 1, wherein the switch structure comprises a stator structure and a support structure which are disposed on the second substrate, wherein the conductive structure is disposed at an end of the support structure away from the second substrate.

10. The antenna according to claim 9, wherein the switch structure further comprises a first comb structure and a second comb structure, wherein the first comb structure is disposed at an end of the stator structure away from the second substrate, and the second comb structure is disposed at an end of the support structure away from the second substrate; in an arrangement direction of the switch structure and the conductive structure, and in a plane parallel to the second substrate, the first comb structure and the second comb structure are located between the stator structure and the support structure, and the conductive structure and the second comb structure are located on both sides of the support structure.

11. The antenna according to claim 10, wherein the switch structure further comprises a first connection structure and a second connection structure, wherein the first comb structure is disposed to the stator structure through the first connection structure, the second comb structure is connected to the conductive structure through the second connection structure, and the conductive structure is disposed to the support structure through the second connection structure.

12. The antenna according to claim 10, wherein the first comb structure comprises a first conductive component forming a comb back of the first comb structure, and a plurality of first conductive elements forming comb teeth of the first comb structure; the second comb structure comprises a second conductive component forming a comb back of the second comb structure, and a plurality of second conductive elements forming comb teeth of the second comb structure;

first ends of the plurality of first conductive elements are connected to the first conductive component, and second ends extend to a first spacer between the plurality of second conductive elements in a direction away from the first conductive component; first ends of the plurality of second conductive elements are connected to the second conductive component, and second ends extend to a second spacer of the plurality of first conductive elements in a direction away from the second conductive component.

13. The antenna according to claim 10, wherein the switch structure further comprises a fixing structure disposed on the second substrate and the support structure disposed on a side of the fixing structure away from the second substrate; in a plane perpendicular to the second substrate and in a direction from the second substrate to the first substrate, one end of the support structure is connected to the conductive structure and the second comb structure, and the other end is connected to the fixing structure.

14. An antenna system comprising a flexible printed circuit and the antenna according to claim 1, wherein the flexible printed circuit is electrically connected to the antenna.

15. A method for driving an antenna, wherein the antenna comprises an antenna structure, the antenna structure comprises a first substrate, a second substrate disposed opposite to the first substrate, and a liquid crystal layer filled between the first substrate and the second substrate, wherein a first conductive layer is provided on a side of the first substrate close to the second substrate, a plurality of slots are provided on the first conductive layer, and the plurality of slots penetrate through the first conductive layer in a direction perpendicular to a plane in which the first conductive layer is located; a plurality of switch structures and a plurality of conductive structures are provided on a side of the second substrate close to the first substrate, wherein the plurality of switch structures are connected to the plurality of conductive structures, respectively; the plurality of conductive structures correspond to the plurality of slots, respectively; the method comprises:

applying a first signal to the first conductive layer; applying a plurality of driving signals in a driving signal group corresponding to a target operating frequency to the plurality of switch structures, respectively; applying a plurality of second signals in a voltage signal group corresponding to a target beam direction to the plurality of conductive structures, respectively; and moving a conductive structure of the plurality of conductive structures to or away from a corresponding slot under control of a corresponding switch structure of the plurality of switch structures.

16. The method for driving an antenna according to claim 15, wherein the switch structure comprises a stator structure, a support structure, a first comb structure and a second comb structure, wherein the support structure and the stator structure are disposed on the second substrate, and the conductive structure is disposed at an end of the support structure away from the second substrate; the first comb structure is disposed at an end of the stator structure away from the second substrate; the second comb structure is disposed at an end of the support structure away from the second substrate; in an arrangement direction of the switch structure and the conductive structure, and in a plane parallel to the second substrate, the first comb structure and the second comb structure are located between the stator structure and the support structure, and the conductive structure and the second comb structure are located on two sides of the support structure; applying the plurality of driving signals in the driving signal group corresponding to the target beam direction to the plurality of switch structures, respectively, comprises applying a plurality of driving signals in a driving signal group corresponding to corresponding to the target beam direction to a plurality of stator structures, respectively, and the driving signals being transmitted to the first comb structure via the stator structures; applying the plurality of second signals in the voltage signal group corresponding to a target beam direction to the plurality of conductive structures, respectively, comprises applying second signals in a voltage signal group corresponding to a target beam direction to a plurality of support structures, respectively, and the second signals being transmitted to the second comb structure and the conductive structure via the support structure.

17. A method for manufacturing an antenna, comprising: manufacturing a first substrate and a second substrate, forming a first conductive layer on a side of the first substrate, forming a plurality of slots on the first conductive layer, wherein the plurality of slots penetrate through the first conductive layer in a direction perpendicular to a plane where the first conductive layer is located; forming a plurality of switch structures and a plurality of conductive structures on a side of the second substrate, wherein the plurality of switch structures are connected with the plurality of conductive structures, respectively; aligning the first substrate with the second substrate, enabling the first conductive layer to be located on a side of the first substrate close to the second substrate, a plurality of switch structures and a plurality of conductive structures located on a side of the second substrate close to the first substrate, the plurality of conductive structures corresponding to the plurality of slots, respectively; and moving a conductive structure of the plurality of conductive structures to or away from a corresponding slot under control of a corresponding switch structure of the plurality of switch structures; and filling liquid crystal between the first substrate and the second substrate to form a liquid crystal layer.

18. The manufacturing method according to claim 17, wherein the switch structure comprises a stator structure, a support structure, a first comb structure, a second comb structure; forming the plurality of switch structures and the plurality of conductive structures on a side of the second substrate, comprises: forming the stator structure and the support structure on a side of the second substrate; forming the first comb structure, the second comb structure and the conductive structure on a side of the stator structure and the support structure away from the second substrate; in an arrangement direction of the switch structure and the conductive structure, and in a plane parallel to the second substrate, the first comb structure and the second comb structure located between the stator structure and the support structure, and the conductive structure and the second comb structure located on two sides of the support structure.

19. The manufacturing method according to claim 18, wherein forming of the stator structure and the support structure on a side of the second substrate comprises:

forming a second insulating layer on a side of the second substrate, patterning the second insulating layer by a patterning process to form a second insulating layer pattern, wherein the second insulating layer pattern comprises a first opening forming the stator structure, and a second opening forming the support structure;

forming the support structure and the stator structure on a side of the second insulating layer away from the second substrate, wherein the stator structure is formed at the first opening, and the support structure is formed at the second opening;

forming the first comb structure, the second comb structure and the conductive structure on the side of the stator structure and the support structure away from the second substrate, comprises:

forming a third insulating layer on the second insulating layer, patterning the third insulating layer by a patterning process to form a third insulating layer pattern, wherein the third insulating layer pattern comprises a third opening forming the first comb structure, a fourth opening forming the second comb structure, and a fifth opening forming the conductive structure;

forming the first comb structure, the second comb structure and the conductive structure on a side of the third insulating layer away from the second insulating layer, wherein the first comb structure is formed at the third opening, the second comb structure is formed at the fourth opening, and the conductive structure is formed at the fifth opening;

after forming the first comb structure, the second comb structure and the conductive structure on the side of the stator structure and the support structure away from the second substrate, the method comprises removing the second insulating layer and the third insulating layer.

20. The manufacturing method according to claim 19, wherein the switch structure further comprises a fixing structure, and before forming the second insulating layer on a side of the second substrate, the method further comprises:

forming a first insulating layer on the second substrate, patterning the first insulating layer by a patterning process to form a first insulating layer pattern, wherein the first insulating layer pattern comprises a sixth opening of the fixing structure;

forming the fixing structure on a side of the first insulating layer away from the second substrate, wherein the fixing structure is formed at the sixth opening; and forming the second insulating layer on a side of the second substrate comprises forming the second insulating layer on a side of the first insulating layer away from the second substrate.

* * * * *